US011662557B2

(12) United States Patent
Zhou et al.

(10) Patent No.: US 11,662,557 B2
(45) Date of Patent: May 30, 2023

(54) OPTICAL IMAGING SYSTEM

(71) Applicant: Zhejiang Sunny Optical Co., Ltd, Ningbo (CN)

(72) Inventors: Yu Zhou, Ningbo (CN); Xinquan Wang, Ningbo (CN); Lin Huang, Ningbo (CN); Fujian Dai, Ningbo (CN); Liefeng Zhao, Ningbo (CN)

(73) Assignee: Zhejiang Sunny Optical Co., Ltd

( * ) Notice: Subject to any disclaimer, the term of this patent is extended or adjusted under 35 U.S.C. 154(b) by 334 days.

(21) Appl. No.: 17/032,852

(22) Filed: Sep. 25, 2020

(65) Prior Publication Data
US 2021/0132339 A1 May 6, 2021

(30) Foreign Application Priority Data
Oct. 31, 2019 (CN) .......................... 201911054135.5

(51) Int. Cl.
*G02B 9/60* (2006.01)
*G02B 13/00* (2006.01)

(52) U.S. Cl.
CPC ........... *G02B 13/0045* (2013.01); *G02B 9/60* (2013.01)

(58) Field of Classification Search
None
See application file for complete search history.

(56) References Cited

U.S. PATENT DOCUMENTS

| 2016/0097917 | A1* | 4/2016 | Liao | G02B 13/0045 359/714 |
| 2016/0195694 | A1* | 7/2016 | Tang | G02B 13/0045 359/714 |
| 2019/0146182 | A1* | 5/2019 | Liao | G02B 13/0045 348/240.99 |

* cited by examiner

*Primary Examiner* — Darryl J Collins
(74) *Attorney, Agent, or Firm* — Barnes & Thornburg LLP

(57) ABSTRACT

The present disclosure discloses an optical imaging system including, sequentially from an object side to an image side along an optical axis, a first lens having refractive power; a second lens having refractive power; a third lens having positive refractive power; a fourth lens having refractive power; and a fifth lens having refractive power. Half of a diagonal length ImgH of an effective pixel area on an imaging plane of the optical imaging system and an entrance pupil diameter EPD of the optical imaging system satisfy: $0.5 < \text{ImgH}/\text{EPD} \leq 1.0$.

18 Claims, 14 Drawing Sheets

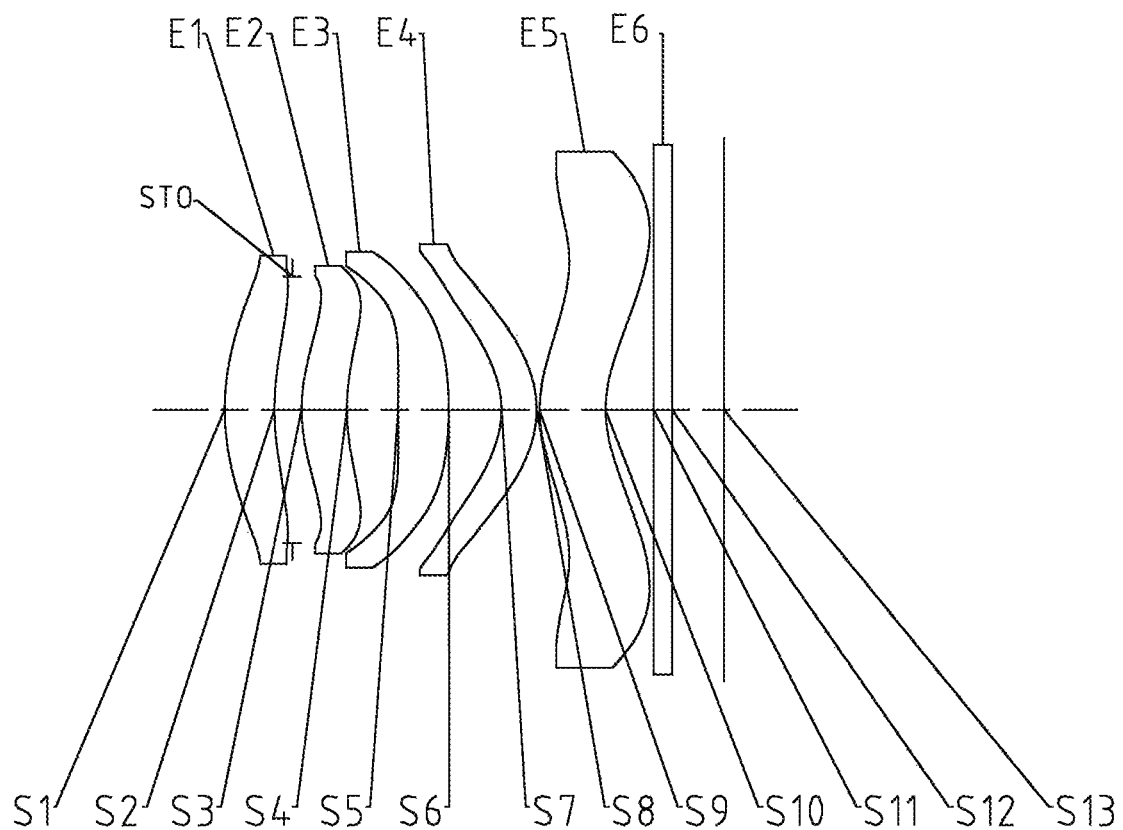
Fig. 5
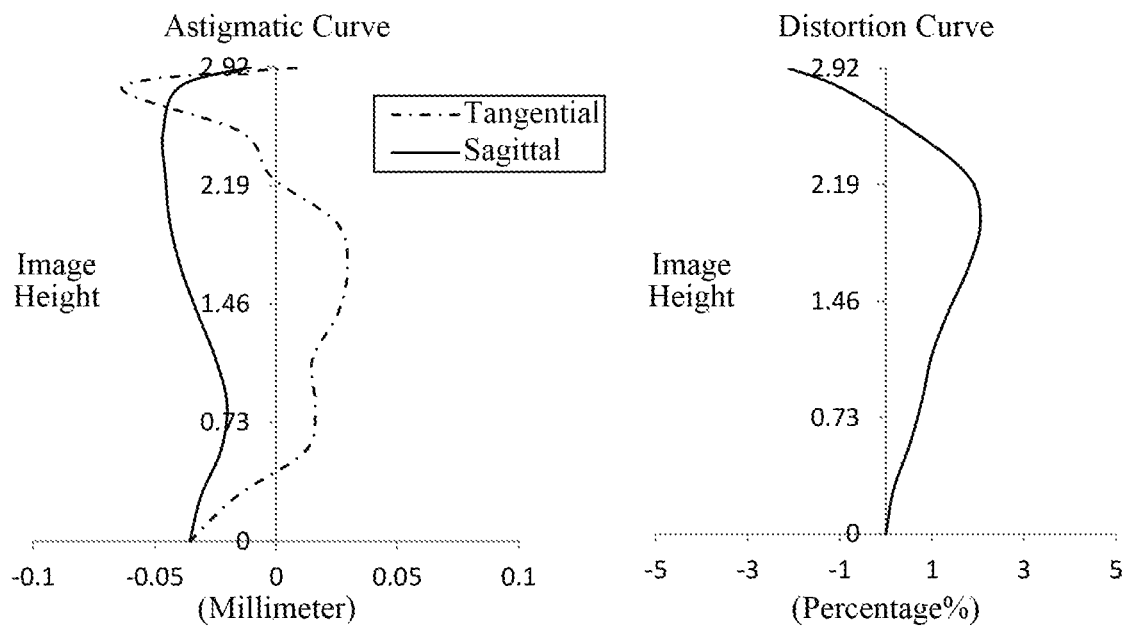
Fig. 6A
Fig. 6B

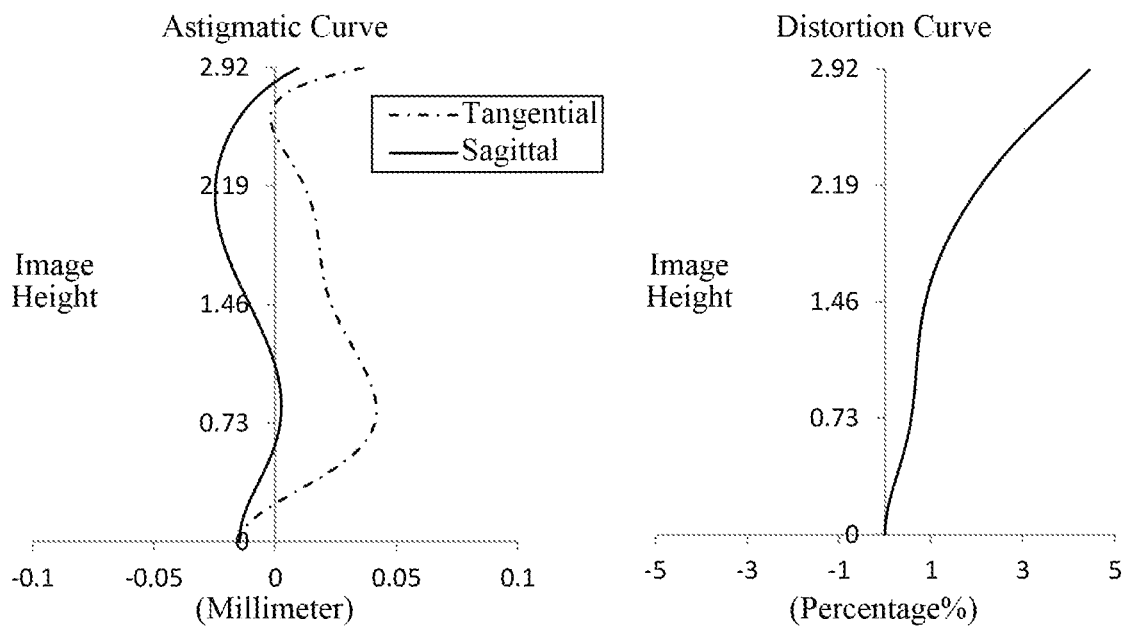
Fig. 12A
Fig. 12B
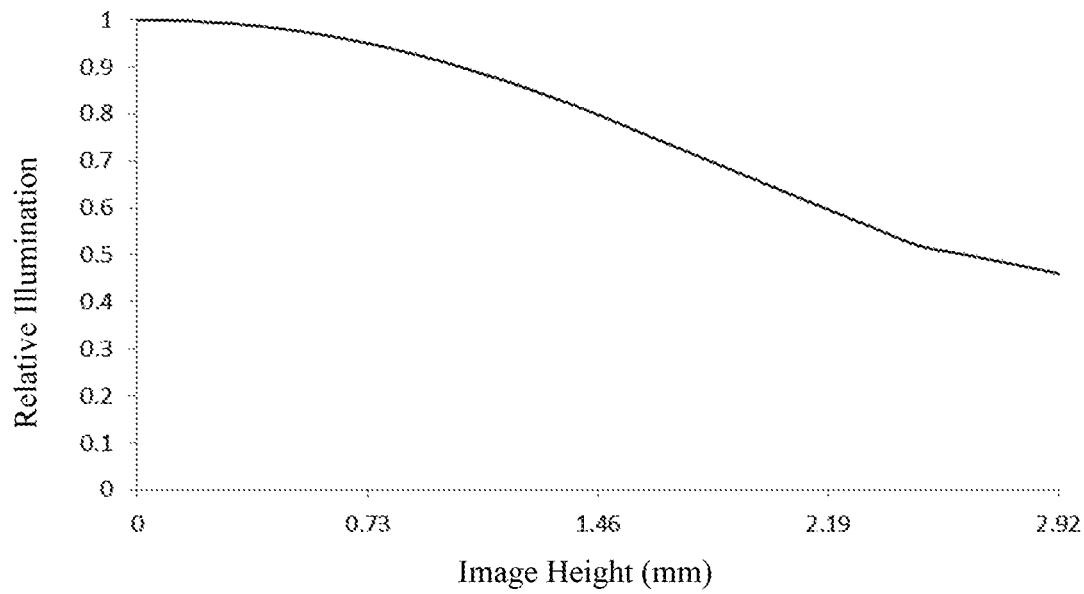
Fig. 12C

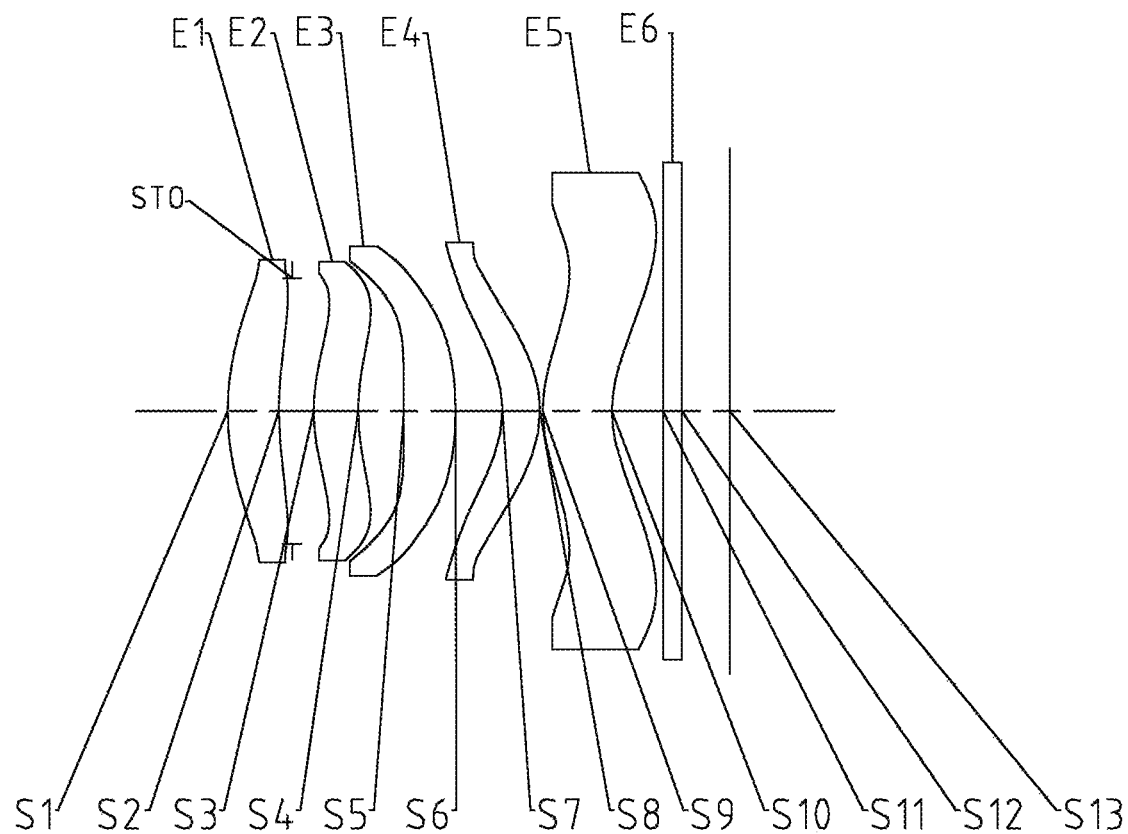
Fig. 13
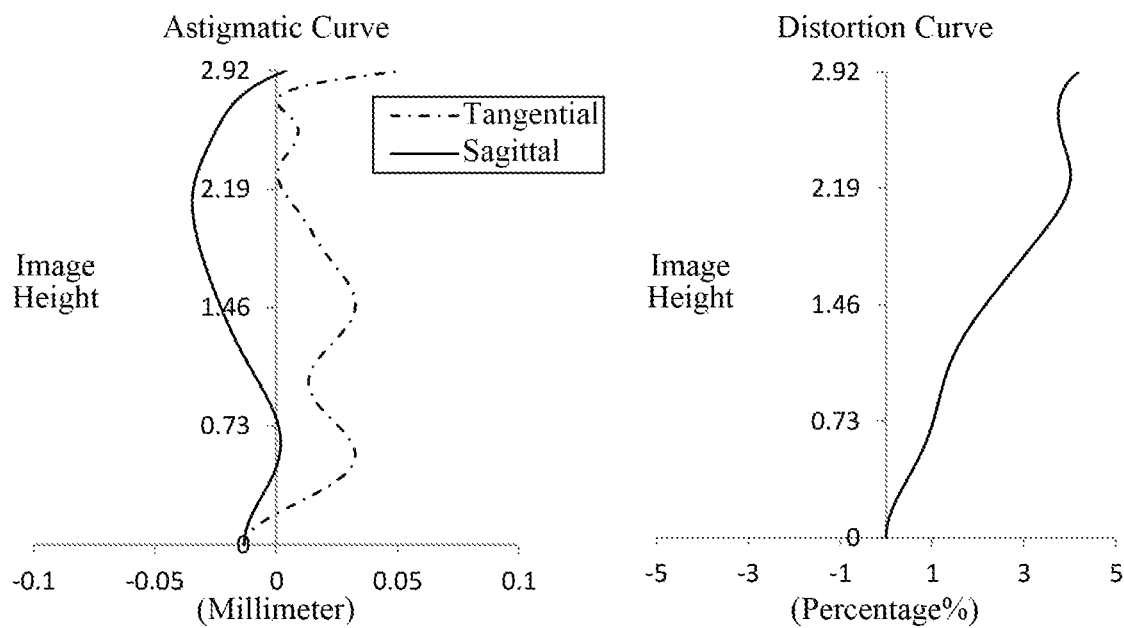
Fig. 14A
Fig. 14B

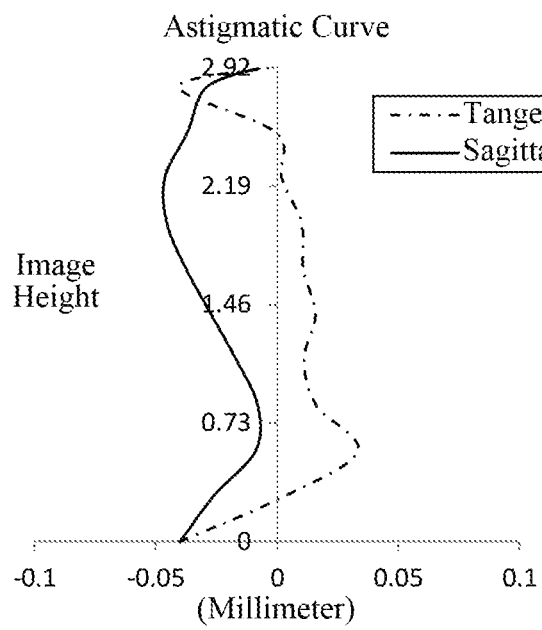
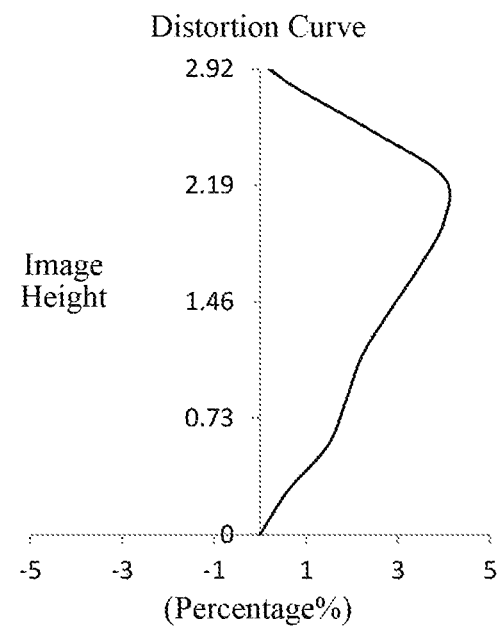
Fig. 16A
Fig. 16B
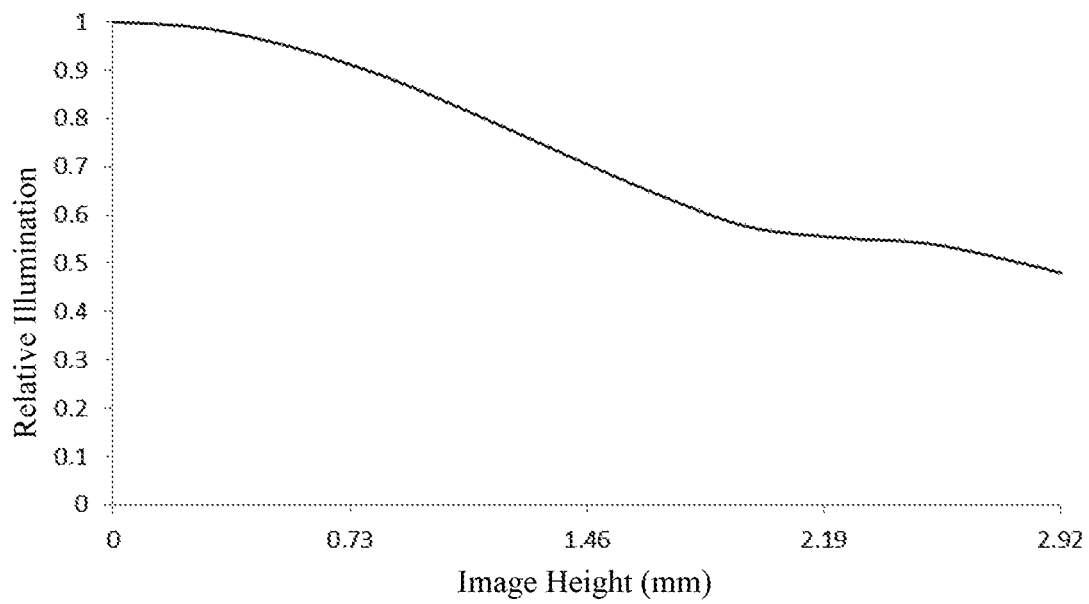
Fig. 16C

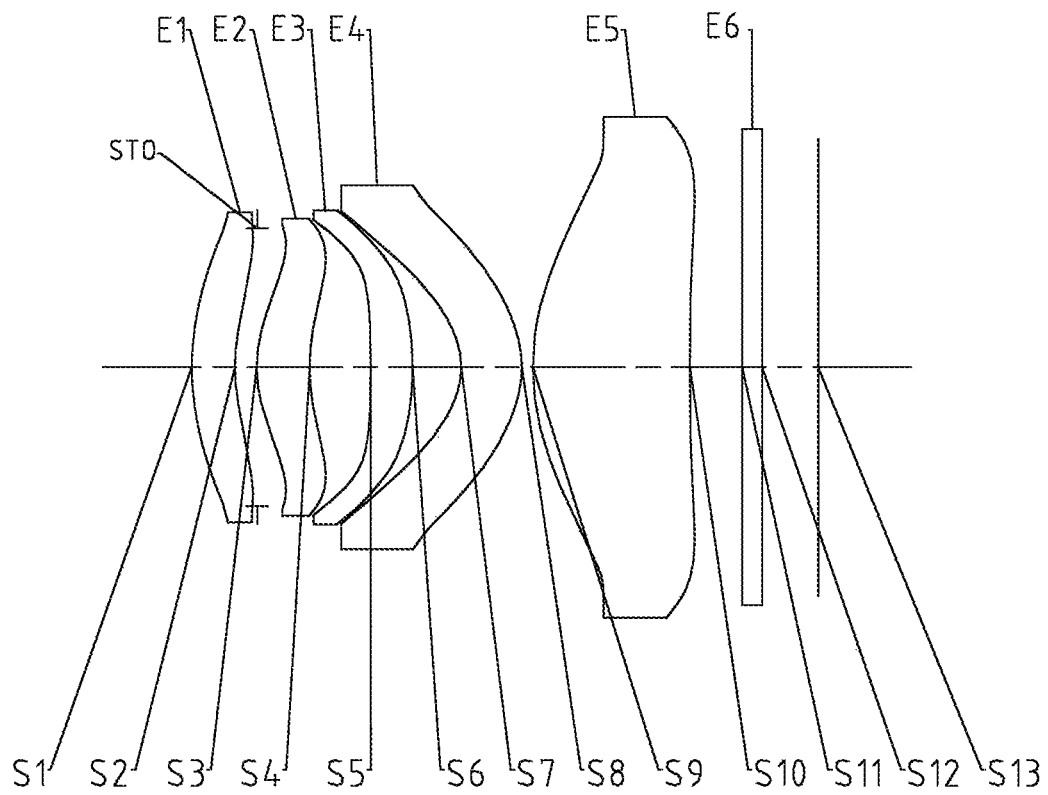
Fig. 17
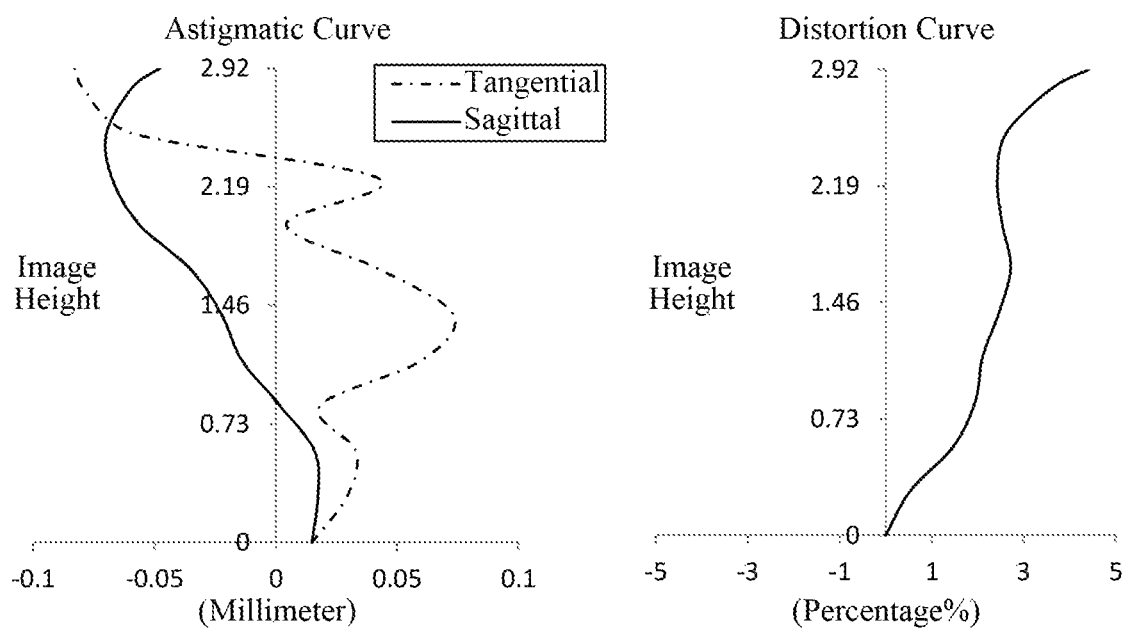
Fig. 18A
Fig. 18B

OPTICAL IMAGING SYSTEM

CROSS-REFERENCE TO RELATED APPLICATION

This application claims benefit of priority to Chinese Patent Application No. 201911054135.5 filed on Oct. 31, 2019 before the China National Intellectual Property Administration, the entire disclosure of which is incorporated herein by reference in its entity.

TECHNICAL FIELD

The present disclosure relates to the field of optical elements, and specifically, relates to an optical imaging system.

BACKGROUND

In recent years, with the development of imaging technology used in somatosensory gaming devices and portable electronic products, such as new smart phones, Time of Flight (TOF, Time-of-flight ranging) lens assemblies are beginning to be known to the public. The industrial-grade LIDAR used in the military and driverless cars have also adopted TOF technology.

TOF is a scheme for measuring depth information, which is mainly composed of an infrared light projector and a receiving module. Compared with other 3D imaging equipment, TOF lens assembly is small and light, and the depth calculation using TOF technology is not affected by the grayscale and features of the object surface. TOF lens assembly has strong anti-interference ability. Therefore, TOF lens assembly has unique advantages in face recognition, stereo imaging, and somatosensory interaction.

How to achieve an imaging system with high pixels, small size, lightness and applicable to TOF technology while ensuring the image quality of the lens assembly is one of the problems that lens assembly manufacturers urgently need to solve.

SUMMARY

In one aspect, the present disclosure provides an optical imaging system which includes, sequentially from an object side to an image side along an optical axis, a first lens having refractive power; a second lens having refractive power; a third lens having positive refractive power; a fourth lens having refractive power; and a fifth lens having refractive power.

In one embodiment, an entrance pupil diameter EPD of the optical imaging system and a center thickness CT2 of the second lens may satisfy: $5.0 < EPD/CT2 < 8.0$.

In one embodiment, a center thickness CT4 of the fourth lens, a center thickness CT5 of the fifth lens and a spaced interval T34 between the third lens and the fourth lens along the optical axis may satisfy: $0.5 < (T34+CT4)/CT5 < 1.5$.

In one embodiment, an entrance pupil diameter EPD of the optical imaging system and half of a diagonal length ImgH of an effective pixel area on an imaging plane of the optical imaging system may satisfy: $0.5 < ImgH/EPD \le 1.0$.

In one embodiment, a total effective focal length f of the optical imaging system, an entrance pupil diameter EPD of the optical imaging system and a distance TTL along the optical axis from an object-side surface of the first lens to an imaging plane of the optical imaging system may satisfy: $1.5 \text{ mm} < f/TTL*EPD \le 3.0 \text{ mm}$.

In one embodiment, a total effective focal length f of the optical imaging system and an effective focal length f3 of the third lens may satisfy: $f3/f<2.5$. Optionally, $0.85<f3/f<2.5$.

In one embodiment, a total effective focal length f of the optical imaging system and an effective focal length f4 of the fourth lens may satisfy: $f/|f4| \le 0.3$.

In one embodiment, a total effective focal length f of the optical imaging system, a radius of curvature R7 of an object-side surface of the fourth lens and a radius of curvature R8 of an image-side surface of the fourth lens may satisfy: $f/R7+f/R8<-4.5$.

In one embodiment, a radius of curvature R1 of an object-side surface of the first lens and a radius of curvature R2 of an image-side surface of the first lens may satisfy: $0.5<R2/R1<2.5$.

In one embodiment, a total effective focal length f of the optical imaging system, a radius of curvature R3 of an object-side surface of the second lens and a radius of curvature R4 of an image-side surface of the second lens may satisfy: $f/R3+f/R4>2.5$. Optionally, $2.5<f/R3+f/R4<5.0$.

In one embodiment, a total effective focal length f of the optical imaging system, a spaced interval T12 between the first lens and the second lens along the optical axis and a spaced interval T23 between the second lens and the third lens along the optical axis may satisfy: $3.0<f/(T12+T23)<5.0$.

In one embodiment, a center thickness CT1 of the first lens and a center thickness CT2 of the second lens may satisfy: $0.5<CT2/CT1<1.5$.

In one embodiment, a maximum effective radius DT11 of an object-side surface of the first lens and a maximum effective radius DT42 of an image-side surface of the fourth lens may satisfy: $0.8 \le DT11/DT42 \le 1.2$.

In one embodiment, a distance SAG32 along the optical axis from an intersection of an image-side surface of the third lens and the optical axis to a vertex of a maximum effective radius of the image-side surface of the third lens, a distance SAG41 along the optical axis from an intersection of an object-side surface of the fourth lens and the optical axis to a vertex of a maximum effective radius of the object-side surface of the fourth lens, and a spaced interval T34 between the third lens and the fourth lens along the optical axis may satisfy: $1.0 \le (|SAG32|+T34)/|SAG41|<2.5$.

In one embodiment, a distance SAG42 along the optical axis from an intersection of an image-side surface of the fourth lens and the optical axis to a vertex of a maximum effective radius of the image-side surface of the fourth lens and a spaced interval ET45 between the fourth lens and the fifth lens at the vertex of the maximum effective radius in a direction parallel to the optical axis may satisfy: $-1.0 \le SAG42/ET45 \le -0.5$.

In one embodiment, a radius of curvature R7 of an object-side surface of the fourth lens and a radius of curvature R8 of an image-side surface of the fourth lens may satisfy: $0.5<R7/R8<1.0$.

In one embodiment, a total effective focal length f of the optical imaging system and an entrance pupil diameter EPD of the optical imaging system satisfy: $f/EPD<1.3$.

The optical imaging system configured above may have characteristics, such as miniaturization, high image quality, good processing consistency, and being able to be used for imaging in the infrared band, so as to be applicable to the TOF technical field.

BRIEF DESCRIPTION OF THE DRAWINGS

Other features, objects, and advantages of the present disclosure will become more apparent by reading the detailed description of the non-limiting examples with reference to the accompanying drawings:

FIG. 5 illustrates a schematic structural view of an optical imaging system according to example 3 of the present disclosure;

FIGS. 6A to 6C illustrate an astigmatic curve, a distortion curve, and a relative illumination curve of the optical imaging system of the example 3, respectively;

FIGS. 12A to 12C illustrate an astigmatic curve, a distortion curve, and a relative illumination curve of the optical imaging system of the example 6, respectively;

FIG. 13 illustrates a schematic structural view of an optical imaging system according to example 7 of the present disclosure;

FIGS. 14A to 14C illustrate an astigmatic curve, a distortion curve, and a relative illumination curve of the optical imaging system of the example 7, respectively;

FIGS. 16A to 16C illustrate an astigmatic curve, a distortion curve, and a relative illumination curve of the optical imaging system of the example 8, respectively;

FIG. 17 illustrates a schematic structural view of an optical imaging system according to example 9 of the present disclosure; and FIGS. 18A to 18C illustrate an astigmatic curve, a distortion curve, and a relative illumination curve of the optical imaging system of the example 9, respectively.

DETAILED DESCRIPTION OF EMBODIMENTS

Figure 1:
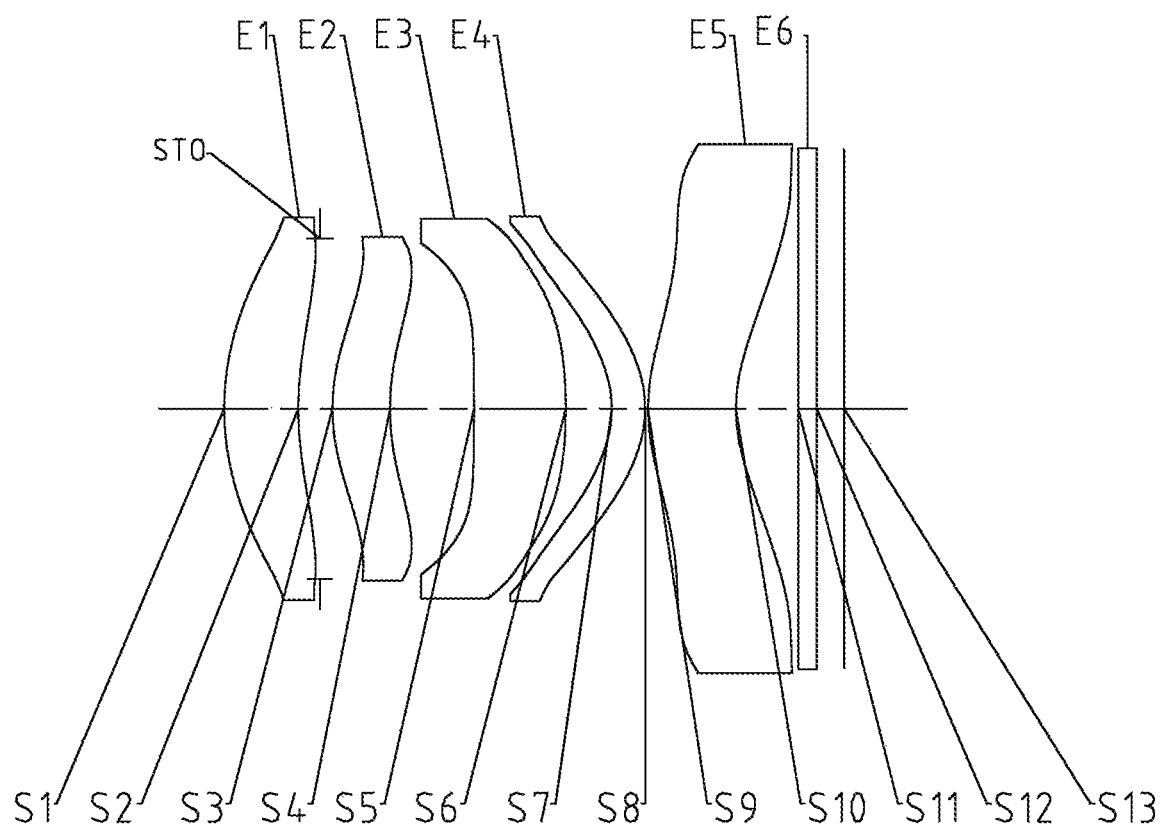
FIG. 1 illustrates a schematic structural view of an optical imaging system according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging system according to an exemplary embodiment of the present disclosure may include five lenses, i.e. a first lens, a second lens, a third lens, a fourth lens and a fifth lens. Each of the first to the fifth lenses has refractive power. The five lenses are arranged sequentially from an object side to an image side along an optical axis.

Among the first lens to the fifth lens, there may be a spaced interval between each two adjacent lenses.

In an exemplary embodiment, the first lens has positive or negative refractive power; the second lens has positive or negative refractive power; the third lens may have positive refractive power; the fourth lens has positive or negative refractive power; and the fifth lens has positive or negative refractive power.

In an exemplary embodiment, the optical imaging system according to the present disclosure may satisfy: 5.0<EPD/CT2<8.0, where EPD is an entrance pupil diameter of the optical imaging system, and CT2 is a center thickness of the second lens. More specifically, EPD and CT2 may further satisfy: 5.3<EPD/CT2<7.6. Satisfying 5.0<EPD/CT2<8.0 may improve the workability of the optical imaging system while ensuring better image quality.

In an exemplary embodiment, the optical imaging system according to the present disclosure may satisfy: 0.5<(T34+CT4)/CT5<1.5, where CT4 is a center thickness of the fourth lens, CT5 is a center thickness of the fifth lens, and T34 is a spaced interval between the third lens and the fourth lens along the optical axis. More specifically, T34, CT4 and CT5 may further satisfy: 0.6<(T34+CT4)/CT5<1.5. Satisfying 0.5<(T34+CT4)/CT5<1.5 is beneficial to improving the stability of the lens assembly and the consistency of mass production, thereby helping to increasing the production rate of the optical imaging system.

In an exemplary embodiment, the optical imaging system according to the present disclosure may satisfy: 0.5<ImgH/EPD≤1.0, where EPD is an entrance pupil diameter of the optical imaging system, and ImgH is half of a diagonal length of an effective pixel area on an imaging plane of the optical imaging system. More specifically, ImgH and EPD may further satisfy: 0.6<ImgH/EPD≤1.0. Satisfying 0.5<ImgH/EPD≤1.0 may make the optical imaging system have a better ability to compensate aberrations.

In an exemplary embodiment, the optical imaging system according to the present disclosure may satisfy: 1.5 mm<f/TTL*EPD≤3.0 mm, where f is a total effective focal length of the optical imaging system, EPD is an entrance pupil diameter of the optical imaging system, and TTL is a distance along the optical axis from an object-side surface of the first lens to an imaging plane of the optical imaging system. More specifically, f, EPD and TTL may further satisfy: 1.7 mm<f/TTL*EPD≤3.0 mm. Satisfying 1.5 mm<f/TTL*EPD≤3.0 mm may ensure the light flux and the relative illumination of the optical imaging system.

In an exemplary embodiment, the optical imaging system according to the present disclosure may satisfy: f3/f<2.5, where f is a total effective focal length of the optical imaging system, and f3 is an effective focal length of the third lens. More specifically, f3 and f may further satisfy: 0.85<f3/f<2.5. Satisfying f3/f<2.5 is beneficial to increasing the field-of-view of the optical imaging system.

In an exemplary embodiment, the optical imaging system according to the present disclosure may satisfy: f/|f4|≤0.3, where f is a total effective focal length of the optical imaging system, and f4 is an effective focal length of the fourth lens. Satisfying f/|f4|≤0.3 may effectively reduce the optical sensitivity of the fourth lens, thereby facilitating mass production.

In an exemplary embodiment, the optical imaging system according to the present disclosure may satisfy: f/R7+f/R8<−4.5, where f is a total effective focal length of the optical imaging system, R7 is a radius of curvature of an object-side surface of the fourth lens, and R8 is a radius of curvature of an image-side surface of the fourth lens. More specifically, f, R7 and R8 may further satisfy: −7.5<f/R7+f/R8<−5.0. Satisfying f/R7+f/R8<−4.5 may reduce the distortion of the optical imaging system, thereby ensuring that the optical imaging system has better image quality.

In an exemplary embodiment, the optical imaging system according to the present disclosure may satisfy: 0.5<R2/R1<2.5, where R1 is a radius of curvature of an object-side surface of the first lens, and R2 is a radius of curvature of an image-side surface of the first lens. More specifically, R2 and R1 may further satisfy: 0.6<R2/R1<2.2. Satisfying 0.5<R2/R1<2.5 may be beneficial to reducing the sensitivity of the system and achieving the characteristics of large field-of-view, large aperture, and high resolution of the imaging system, and may ensure that the first lens has good manufacturability.

In an exemplary embodiment, the optical imaging system according to the present disclosure may satisfy: f/R3+f/R4>2.5, where f is a total effective focal length of the optical imaging system, R3 is a radius of curvature of an object-side surface of the second lens, and R4 is a radius of curvature of an image-side surface of the second lens. More specifically, f, R3 and R4 may further satisfy: 2.5<f/R3+f/R4<5.0, for example, 2.7<f/R3+f/R4<4.0. Satisfying f/R3+f/R4>2.5 may reduce the distortion of the optical imaging system, thereby ensuring that the optical imaging system has better image quality.

In an exemplary embodiment, the optical imaging system according to the present disclosure may satisfy: 3.0<f/(T12+T23)<5.0, where f is a total effective focal length of the optical imaging system, T12 is a spaced interval between the first lens and the second lens along the optical axis, and T23 is a spaced interval between the second lens and the third lens along the optical axis. More specifically, f, T12 and T23 may further satisfy: 3.2<f/(T12+T23)<4.5. Satisfying 3.0<f/(T12+T23)<5.0 may ensure that the optical imaging system has good processing characteristics.

In an exemplary embodiment, the optical imaging system according to the present disclosure may satisfy: 0.5<CT2/CT1<1.5, where CT1 is a center thickness of the first lens, and CT2 is a center thickness of the second lens. More specifically, CT2 and CT1 may further satisfy: 0.5<CT2/CT1<1.4. Satisfying 0.5<CT2/CT1<1.5 may make the lens easy to injection molding and improve the workability of the optical imaging system. In addition, it may also ensure that the optical imaging system has better image quality.

In an exemplary embodiment, the optical imaging system according to the present disclosure may satisfy: 0.8≤DT11/DT42≤1.2, where DT11 is a maximum effective radius of an object-side surface of the first lens, and DT42 is a maximum effective radius of an image-side surface of the fourth lens. Satisfying 0.8≤DT11/DT42≤1.2 may improve the ability of the optical imaging system to correct off-axis aberrations, thereby enabling the system to obtain higher image quality.

In an exemplary embodiment, the optical imaging system according to the present disclosure may satisfy: 1.0≤(|SAG32|+T34)/|SAG41|<2.5, where SAG32 is a distance along the optical axis from an intersection of an image-side surface of the third lens and the optical axis to a vertex of a maximum effective radius of the image-side surface of the third lens, SAG41 is a distance along the optical axis from an intersection of an object-side surface of the fourth lens and the optical axis to a vertex of a maximum effective radius of the object-side surface of the fourth lens, and T34 is a spaced interval between the third lens and the fourth lens along the optical axis. More specifically, SAG32, T34 and SAG41 may further satisfy: 1.0≤(|SAG32|+T34)/|SAG41|<2.4. Satisfying 1.0≤(|SAG32|+T34)/|SAG41|<2.5 may increase the variability of the shape of the lens surface, and thus make the optical imaging system have better astigmatism and field curvature correction capabilities.

In an exemplary embodiment, the optical imaging system according to the present disclosure may satisfy: $-1.0 \leq SAG42/ET45 \leq -0.5$, where SAG42 is a distance along the optical axis from an intersection of an image-side surface of the fourth lens and the optical axis to a vertex of a maximum effective radius of the image-side surface of the fourth lens, and ET45 is a spaced interval between the fourth lens and the fifth lens at the vertex of the maximum effective radius in a direction parallel to the optical axis. Satisfying $-1.0 \leq SAG42/ET45 \leq -0.5$ may effectively adjust the chief ray angle of the system, thereby improving the image quality.

In an exemplary embodiment, the optical imaging system according to the present disclosure may satisfy: $0.5 < R7/R8 < 1.0$, where R7 is a radius of curvature of an object-side surface of the fourth lens, and R8 is a radius of curvature of an image-side surface of the fourth lens. More specifically, R7 and R8 may further satisfy: $0.6 < R7/R8 < 1.0$. Satisfying $0.5 < R7/R8 < 1.0$ may be beneficial to reducing the sensitivity of the system, and achieving the characteristics of large field-of-view, large aperture and high resolution of the imaging system. Meanwhile, it may ensure that the fourth lens has good manufacturability.

In an exemplary embodiment, the optical imaging system according to the present disclosure may satisfy: $f/EPD < 1.3$, where f is a total effective focal length of the optical imaging system, and EPD is an entrance pupil diameter of the optical imaging system. More specifically, f and EPD may further satisfy: $f/EPD < 1.2$. Satisfying $f/EPD < 1.3$ may effectively increase the energy density on the imaging plane and improve the signal-to-noise ratio (that is, infrared measurement accuracy) of the output signal of the image sensor.

In an exemplary embodiment, the optical imaging system according to the present disclosure may further include a stop disposed between the first lens and the second lens. Optionally, the above optical imaging system may further include an optical filter for correcting the color deviation and/or a protective glass for protecting the photosensitive element located on an imaging plane.

The optical imaging system according to the above embodiments of the present disclosure may employ a plurality of lenses, such as five lenses as described above. By properly configuring the refractive power of each lens, the surface shape, the center thickness of each lens, and spaced intervals along the optical axis between the lenses, the incident light may be effectively converged, the total length of the optical imaging system may be reduced, and the workability of the optical imaging system may be improved, such that the structure of each lens is more compact, the optical imaging system is more advantageous for production processing and may be applied to portable electronic products. The optical imaging system configured above may have the characteristics of large aperture, miniaturization and the like, and may be applied to the infrared band imaging and TOF technical fields.

In the embodiments of the present disclosure, at least one of the surfaces of lenses is aspheric, that is, at least one of the object-side surface of the first lens to the image-side surface of the fifth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens and the fifth lens is aspheric. Optionally, the object-side surface and the image-side surface of each of the first lens, the second lens, the third lens, the fourth lens and the fifth lens are aspheric.

However, it will be understood by those skilled in the art that the number of lenses constituting the optical imaging system may be varied to achieve the various results and advantages described in this specification without departing from the technical solution claimed by the present disclosure. For example, although the embodiment is described by taking five lenses as an example, the optical imaging system is not limited to include five lenses. The optical imaging system may also include other numbers of lenses if desired.

Some specific examples of an optical imaging system applicable to the above embodiment will be further described below with reference to the accompanying drawings.

Example 1

An optical imaging system according to example 1 of the present disclosure is described below with reference to FIG. 1 to FIG. 2C. FIG. 1 shows a schematic structural view of the optical imaging system according to example 1 of the present disclosure.

As shown in FIG. 1, the optical imaging system includes a first lens E1, a stop STO, a second lens E2, a third lens E3, a fourth lens E4, a fifth lens E5, an optical filter E6 and an imaging plane S13, which are sequentially arranged from an object side to an image side.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a concave surface. The third lens E3 has positive refractive power, an object-side surface S5 thereof is a concave surface, and an image-side surface S6 thereof is a convex surface. The fourth lens E4 has negative refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a concave surface. The optical filter E6 has an object-side surface S11 and an image-side surface S12. Light from an object sequentially passes through the respective surfaces S1 to S12 and is finally imaged on the imaging plane S13.

Table 1 is a table illustrating basic parameters of the optical imaging system of example 1, wherein the units for the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 3.0723 | 0.8362 | 1.633 | 20.4 | 18.74 | −1.5350 |
| S2 | Aspheric | 3.7036 | 0.2463 | | | | −8.9534 |
| STO | Spherical | Infinite | 0.1397 | | | | |
| S3 | Aspheric | 2.2093 | 0.6501 | 1.633 | 20.4 | 11.20 | −8.6835 |
| S4 | Aspheric | 2.8387 | 0.9485 | | | | 0.2239 |
| S5 | Aspheric | −200.0000 | 1.0362 | 1.633 | 20.4 | 8.36 | −99.0000 |
| S6 | Aspheric | −5.1806 | 0.5204 | | | | 0.0000 |
| S7 | Aspheric | −1.1962 | 0.3760 | 1.633 | 20.4 | −200.01 | −1.0000 |
| S8 | Aspheric | −1.3550 | 0.0300 | | | | −0.9508 |
| S9 | Aspheric | 2.0104 | 0.9921 | 1.633 | 20.4 | 50.84 | −9.5019 |
| S10 | Aspheric | 1.7329 | 0.7050 | | | | −1.2024 |
| S11 | Spherical | Infinite | 0.2100 | 1.517 | 64.2 | | |
| S12 | Spherical | Infinite | 0.3096 | | | | |
| S13 | Spherical | Infinite | | | | | |

In this example, a total effective focal length f of the optical imaging system is 4.46 mm, a maximum field-of-view FOV of the optical imaging system is 32.5°, and a ratio f/EPD of the total effective focal length f of the optical imaging system to an entrance pupil diameter EPD of the optical imaging system is 1.11.

In example 1, the object-side surface and the image-side surface of any one of the first lens E1 to the fifth lens E5 are aspheric. The surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S10 in example 1.

TABLE 2

| Surface number | A4 | A6 | A8 | A10 | A12 |
|---|---|---|---|---|---|
| S1 | 1.1168E−03 | 3.3740E−04 | 2.8440E−04 | −2.1195E−04 | 4.1465E−05 |
| S2 | −1.6220E−02 | 3.4060E−03 | −9.7622E−04 | 1.2158E−04 | −8.2001E−06 |
| S3 | 5.1992E−02 | −5.4950E−02 | 3.1673E−02 | −1.6078E−02 | 6.2959E−03 |
| S4 | −1.9097E−02 | −7.1019E−03 | −7.0904E−03 | 7.2856E−03 | −3.6044E−03 |
| S5 | −2.7537E−02 | 8.4030E−03 | −2.8585E−02 | 3.0589E−02 | −2.1035E−02 |
| S6 | −2.6367E−02 | 7.0696E−03 | −1.6918E−02 | 1.8043E−02 | −1.1804E−02 |
| S7 | 1.5854E−01 | −1.7083E−01 | 1.2763E−01 | −6.4227E−02 | 2.2641E−02 |
| S8 | 3.2381E−02 | 1.5469E−02 | −4.2799E−02 | 3.9575E−02 | −1.9875E−02 |
| S9 | −6.1501E−03 | −1.5633E−03 | −8.9398E−04 | 7.1611E−04 | −2.1847E−04 |
| S10 | −9.7926E−02 | 5.1276E−02 | −2.3467E−02 | 7.7303E−03 | −1.7400E−03 |

| Surface number | A14 | A16 | A18 | A20 |
|---|---|---|---|---|
| S1 | −3.9860E−06 | 0.0000E+00 | 0.0000E+00 | 0.0000E+00 |
| S2 | 0.0000E+00 | 0.0000E+00 | 0.0000E+00 | 0.0000E+00 |
| S3 | −1.6593E−03 | 2.6031E−04 | −1.8368E−05 | 0.0000E+00 |
| S4 | 1.0313E−03 | −1.4852E−04 | 4.8645E−06 | 6.2952E−07 |
| S5 | 8.2694E−03 | −1.6439E−03 | 1.2804E−04 | 0.0000E+00 |
| S6 | 4.8260E−03 | −1.1346E−03 | 1.3809E−04 | −6.7212E−06 |
| S7 | −5.2112E−03 | 6.9770E−04 | −4.5636E−05 | 9.3328E−07 |
| S8 | 6.1096E−03 | −1.1610E−03 | 1.2500E−04 | −5.7634E−06 |
| S9 | 4.0141E−05 | −4.4438E−06 | 2.6802E−07 | −6.7271E−09 |
| S10 | 2.5951E−04 | −2.4467E−05 | 1.3178E−06 | −3.0814E−08 |

Figures 2A, 2B:
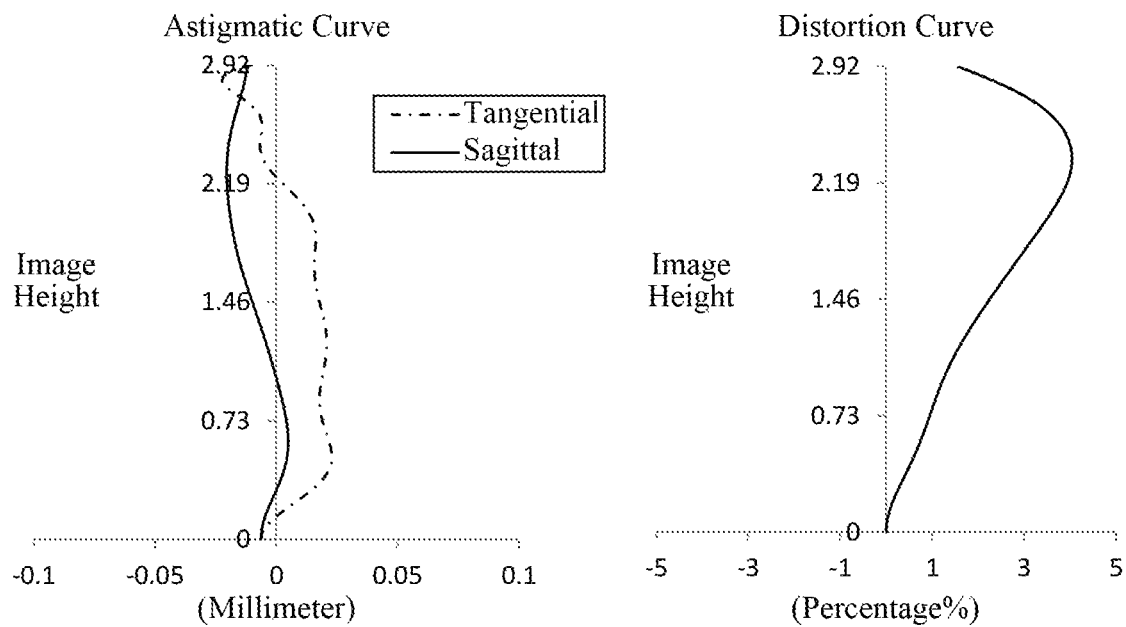
FIGS. 2A to 2C illustrate an astigmatic curve, a distortion curve, and a relative illumination curve of the optical imaging system of the example 1, respectively.
Figure 2C:
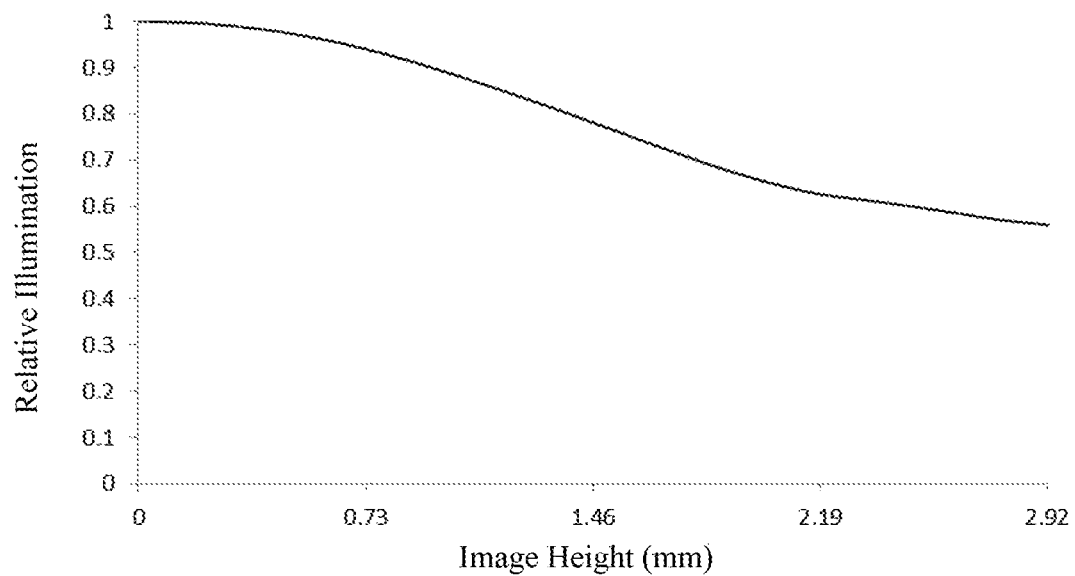

FIG. 2A illustrates an astigmatic curve of the optical imaging system according to example 1, representing a curvature of a tangential plane and a curvature of a sagittal plane. FIG. 2B illustrates a distortion curve of the optical imaging system according to example 1, representing amounts of distortion corresponding to different image heights. FIG. 2C illustrates a relative illumination curve of the optical imaging system according to example 1, representing the relative illumination changes corresponding to different image heights. It can be seen from FIG. 2A to FIG. 2C that the optical imaging system provided in example 1 may achieve good image quality.

Example 2

Figure 3:
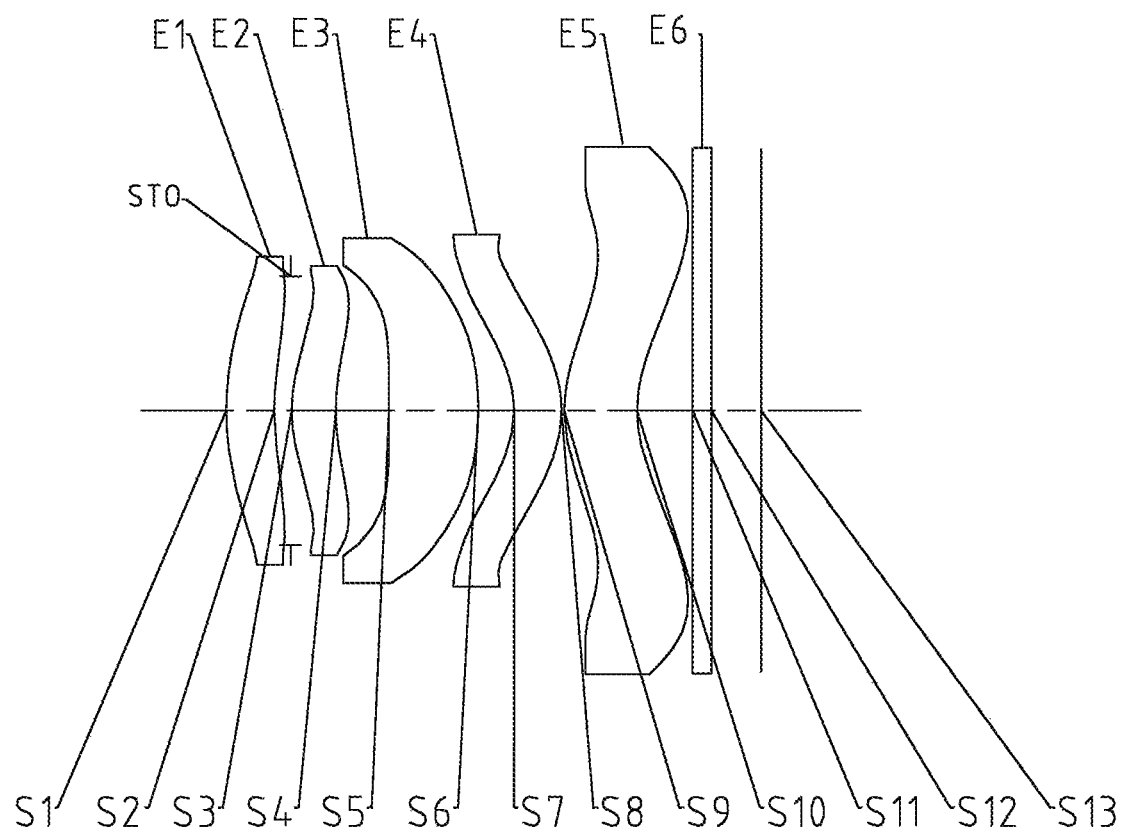
FIG. 3 illustrates a schematic structural view of an optical imaging system according to example 2 of the present disclosure.

An optical imaging system according to example 2 of the present disclosure is described below with reference to FIG. 3 to FIG. 4C. In this example and the following examples, for the purpose of brevity, the description of parts similar to those in example 1 will be omitted. FIG. 3 shows a schematic structural view of the optical imaging system according to example 2 of the present disclosure.

As shown in FIG. 3, the optical imaging system includes a first lens E1, a stop STO, a second lens E2, a third lens E3, a fourth lens E4, a fifth lens E5, an optical filter E6 and an imaging plane S13, which are sequentially arranged from an object side to an image side.

The first lens E1 has negative refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a concave surface. The optical filter E6 has an object-side surface S11 and an image-side surface S12. Light from an object sequentially passes through the respective surfaces S1 to S12 and is finally imaged on the imaging plane S13.

In this example, a total effective focal length f of the optical imaging system is 3.48 mm, a maximum field-of-view FOV of the optical imaging system is 39.5°, and a ratio f/EPD of the total effective focal length f of the optical imaging system to an entrance pupil diameter EPD of the optical imaging system is 1.11.

Table 3 is a table illustrating basic parameters of the optical imaging system of example 2, wherein the units for the radius of curvature, the thickness/distance and the focal length are millimeter (mm). Table 4 shows high-order coefficients applicable to each aspheric surface in example 2, wherein the surface shape of each aspheric surface may be defined by the formula (1) given in the above example 1.

TABLE 3

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 3.2981 | 0.5376 | 1.633 | 20.4 | −91.04 | −2.7775 |
| S2 | Aspheric | 2.9226 | 0.1842 | | | | −14.2019 |
| STO | Spherical | Infinite | 0.0117 | | | | |
| S3 | Aspheric | 1.7541 | 0.4956 | 1.633 | 20.4 | 6.46 | −13.4745 |
| S4 | Aspheric | 2.7275 | 0.5947 | | | | 0.4178 |
| S5 | Aspheric | 100.0000 | 1.0023 | 1.633 | 20.4 | 5.42 | −72.7368 |
| S6 | Aspheric | −3.5517 | 0.4009 | | | | 0.0000 |
| S7 | Aspheric | −1.1566 | 0.5333 | 1.633 | 20.4 | −86.41 | −1.0000 |
| S8 | Aspheric | −1.3931 | 0.0300 | | | | −0.9697 |
| S9 | Aspheric | 1.6190 | 0.8157 | 1.633 | 20.4 | 20.69 | −2.7858 |
| S10 | Aspheric | 1.4851 | 0.6240 | | | | −1.4658 |
| S11 | Spherical | Infinite | 0.2100 | 1.517 | 64.2 | | |
| S12 | Spherical | Infinite | 0.5600 | | | | |
| S13 | Spherical | Infinite | | | | | |

TABLE 4

| Surface number | A4 | A6 | A8 | A10 | A12 |
|---|---|---|---|---|---|
| S1 | −9.8114E−03 | 6.6136E−03 | 2.5192E−04 | −2.2969E−03 | 9.1960E−04 |
| S2 | −6.0292E−02 | 3.8381E−02 | −1.7302E−02 | 4.0810E−03 | −4.4652E−04 |
| S3 | 1.5102E−01 | −3.2121E−01 | 3.8911E−01 | −3.3146E−01 | 1.8807E−01 |
| S4 | −3.9449E−02 | −1.3948E−02 | −5.1683E−02 | 1.0523E−01 | −1.0509E−01 |
| S5 | −4.2317E−02 | −5.9254E−03 | −1.2018E−02 | 6.1814E−03 | −6.0760E−03 |
| S6 | −2.9254E−02 | −3.5399E−02 | 5.9061E−02 | −6.4675E−02 | 4.8825E−02 |
| S7 | 2.0793E−01 | −2.6839E−01 | 2.5680E−01 | −1.5081E−01 | 6.1706E−02 |
| S8 | 7.6010E−02 | −7.7898E−02 | 8.1621E−02 | −5.3325E−02 | 2.4937E−02 |
| S9 | −6.4525E−02 | 3.1556E−02 | −1.4745E−02 | 4.3228E−03 | −8.3049E−04 |
| S10 | −1.0023E−01 | 5.2470E−02 | −2.4017E−02 | 7.8222E−03 | −1.7414E−03 |

| Surface number | A14 | A16 | A18 | A20 |
|---|---|---|---|---|
| S1 | −1.3084E−04 | 0.0000E+00 | 0.0000E+00 | 0.0000E+00 |
| S2 | 0.0000E+00 | 0.0000E+00 | 0.0000E+00 | 0.0000E+00 |
| S3 | −6.7210E−02 | 1.3586E−02 | −1.1813E−03 | 0.0000E+00 |
| S4 | 6.1265E−02 | −2.0944E−02 | 3.8713E−03 | −2.9706E−04 |
| S5 | 6.4648E−03 | −2.7005E−03 | 3.7449E−04 | 0.0000E+00 |
| S6 | −2.2047E−02 | 5.6441E−03 | −7.6196E−04 | 4.2387E−05 |
| S7 | −1.8035E−02 | 3.4601E−03 | −3.7436E−04 | 1.6880E−05 |

TABLE 4-continued

| | | | | |
|---|---|---|---|---|
| S8 | −8.3629E−03 | 1.8636E−03 | −2.4336E−04 | 1.4129E−05 |
| S9 | 1.0493E−04 | −7.8972E−06 | 2.9118E−07 | −3.1314E−09 |
| S10 | 2.5667E−04 | −2.3918E−05 | 1.2727E−06 | −2.9342E−08 |

Figure 4A:
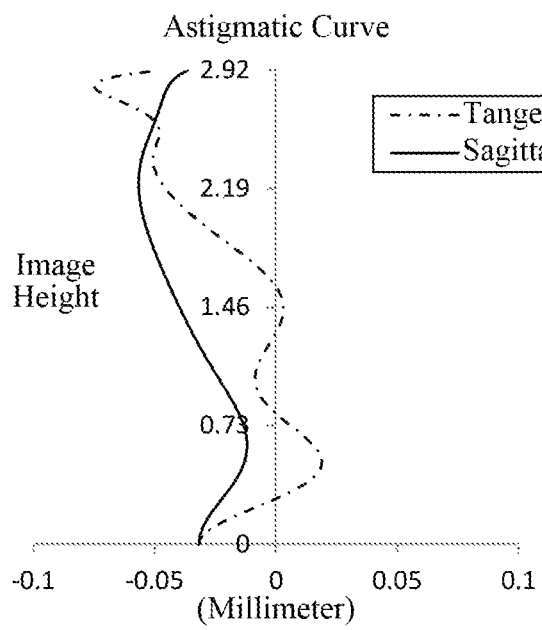
FIGS. 4A to 4C illustrate an astigmatic curve, a distortion curve, and a relative illumination curve of the optical imaging system of the example 2, respectively.
Figure 4B:
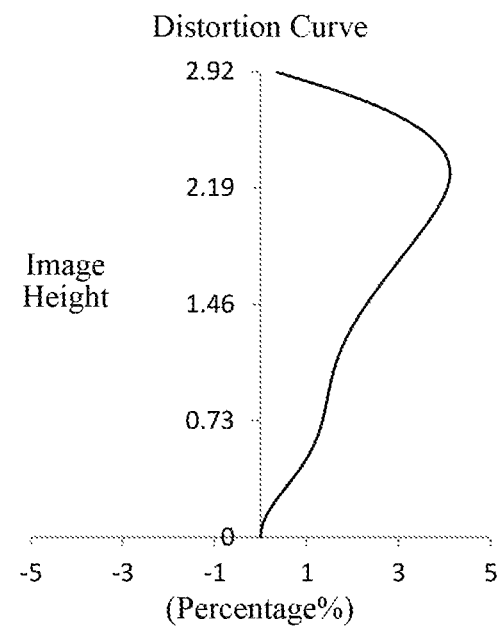
Figure 4C:
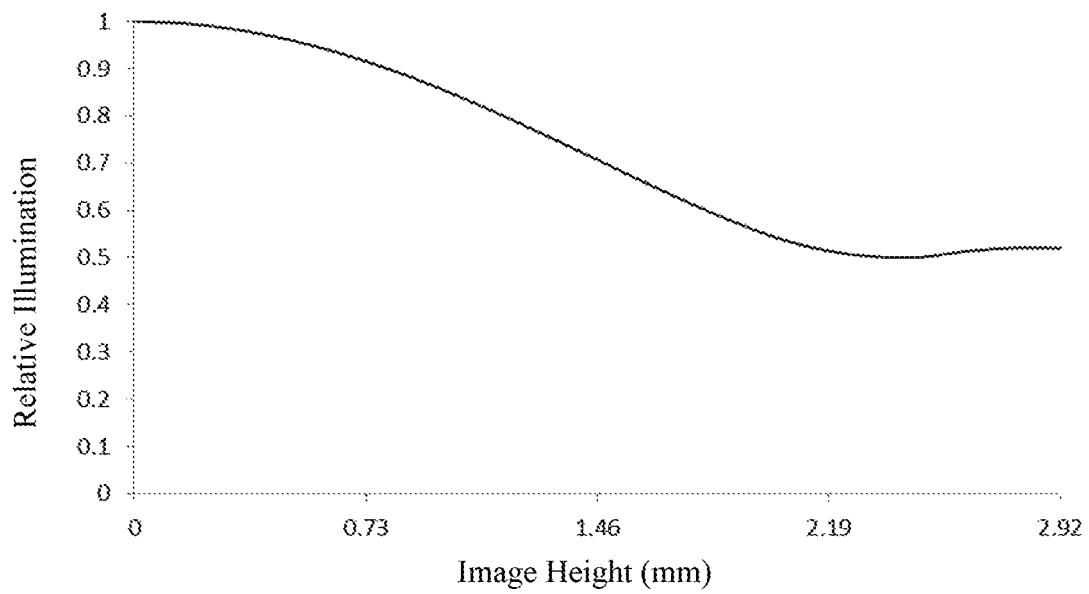

FIG. 4A illustrates an astigmatic curve of the optical imaging system according to example 2, representing a curvature of a tangential plane and a curvature of a sagittal plane. FIG. 4B illustrates a distortion curve of the optical imaging system according to example 2, representing amounts of distortion corresponding to different image heights. FIG. 4C illustrates a relative illumination curve of the optical imaging system according to example 2, representing the relative illumination changes corresponding to different image heights. It can be seen from FIG. 4A to FIG. 4C that the optical imaging system provided in example 2 may achieve good image quality.

Example 3

An optical imaging system according to example 3 of the present disclosure is described below with reference to FIG. 5 to FIG. 6C. FIG. 5 shows a schematic structural view of the optical imaging system according to example 3 of the present disclosure.

As shown in FIG. 5, the optical imaging system includes a first lens E1, a stop STO, a second lens E2, a third lens E3, a fourth lens E4, a fifth lens E5, an optical filter E6 and an imaging plane S13, which are sequentially arranged from an object side to an image side.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a concave surface. The optical filter E6 has an object-side surface S11 and an image-side surface S12. Light from an object sequentially passes through the respective surfaces S1 to S12 and is finally imaged on the imaging plane S13.

In this example, a total effective focal length f of the optical imaging system is 3.45 mm, a maximum field-of-view FOV of the optical imaging system is 40.6°, and a ratio f/EPD of the total effective focal length f of the optical imaging system to an entrance pupil diameter EPD of the optical imaging system is 1.11.

Table 5 is a table illustrating basic parameters of the optical imaging system of example 3, wherein the units for the radius of curvature, the thickness/distance and the focal length are millimeter (mm). Table 6 shows high-order coefficients applicable to each aspheric surface in example 3, wherein the surface shape of each aspheric surface may be defined by the formula (1) given in the above example 1.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 462.0000 | | | | |
| S1 | Aspheric | 2.7269 | 0.5575 | 1.633 | 20.4 | 33.69 | −2.7534 |
| S2 | Aspheric | 2.8770 | 0.2036 | | | | −11.6425 |
| STO | Spherical | Infinite | 0.1015 | | | | |
| S3 | Aspheric | 1.9817 | 0.5088 | 1.633 | 20.4 | 9.39 | −11.6995 |
| S4 | Aspheric | 2.6718 | 0.5750 | | | | 0.0058 |
| S5 | Aspheric | 31.6851 | 0.5675 | 1.633 | 20.4 | 5.62 | −72.7368 |
| S6 | Aspheric | −3.9953 | 0.5934 | | | | 0.0000 |
| S7 | Aspheric | −1.0161 | 0.3929 | 1.633 | 20.4 | −95.36 | −1.0000 |
| S8 | Aspheric | −1.1887 | 0.0300 | | | | −0.9265 |
| S9 | Aspheric | 1.4893 | 0.7399 | 1.633 | 20.4 | 18.25 | −3.0467 |
| S10 | Aspheric | 1.3791 | 0.5398 | | | | −1.6613 |
| S11 | Spherical | Infinite | 0.2100 | 1.517 | 64.2 | | |
| S12 | Spherical | Infinite | 0.5800 | | | | |
| S13 | Spherical | Infinite | | | | | |

TABLE 6

| Surface number | A4 | A6 | A8 | A10 | A12 |
|---|---|---|---|---|---|
| S1 | −6.4646E−03 | 4.7850E−03 | 7.4552E−04 | −2.5798E−03 | 1.0405E−03 |
| S2 | −2.3842E−02 | 4.0408E−03 | −1.6229E−03 | 1.3805E−04 | −3.7593E−05 |
| S3 | 9.5075E−02 | −1.6068E−01 | 1.3843E−01 | −9.4860E−02 | 4.5987E−02 |
| S4 | −1.9571E−02 | −7.6945E−02 | 1.4762E−01 | −2.4248E−01 | 2.4431E−01 |
| S5 | −5.1932E−02 | 4.4390E−02 | −1.5569E−01 | 2.1893E−01 | −1.9773E−01 |
| S6 | −2.6116E−02 | −5.4676E−02 | 8.5933E−02 | −8.9316E−02 | 4.8865E−02 |

TABLE 6-continued

| | | | | | |
|---|---|---|---|---|---|
| S7 | 2.9939E−01 | −4.8565E−01 | 5.4621E−01 | −4.1377E−01 | 2.1957E−01 |
| S8 | 6.6937E−02 | −4.1243E−02 | −3.1449E−03 | 4.5038E−02 | −4.6088E−02 |
| S9 | −1.1570E−01 | 9.6893E−02 | −6.5342E−02 | 2.9289E−02 | −8.7830E−03 |
| S10 | −1.3975E−01 | 9.2559E−02 | −4.7597E−02 | 1.6626E−02 | −3.8554E−03 |

| Surface number | A14 | A16 | A18 | A20 |
|---|---|---|---|---|
| S1 | −1.5427E−04 | 0.0000E+00 | 0.0000E+00 | 0.0000E+00 |
| S2 | 0.0000E+00 | 0.0000E+00 | 0.0000E+00 | 0.0000E+00 |
| S3 | −1.5098E−02 | 3.1569E−03 | −3.4536E−04 | 0.0000E+00 |
| S4 | −1.5125E−01 | 5.5971E−02 | −1.1345E−02 | 9.6839E−04 |
| S5 | 1.0149E−01 | −2.6265E−02 | 2.6648E−03 | 0.0000E+00 |
| S6 | −1.2060E−02 | 6.2304E−04 | 2.2105E−04 | −2.7514E−05 |
| S7 | −7.6078E−02 | 1.5333E−02 | −1.5098E−03 | 4.6480E−05 |
| S8 | 2.5675E−02 | −8.4675E−03 | 1.5042E−03 | −1.0887E−04 |
| S9 | 1.7289E−03 | −2.1172E−04 | 1.4518E−05 | −4.2418E−07 |
| S10 | 5.7691E−04 | −5.3111E−05 | 2.7212E−06 | −5.9136E−08 |

Figure 6C:
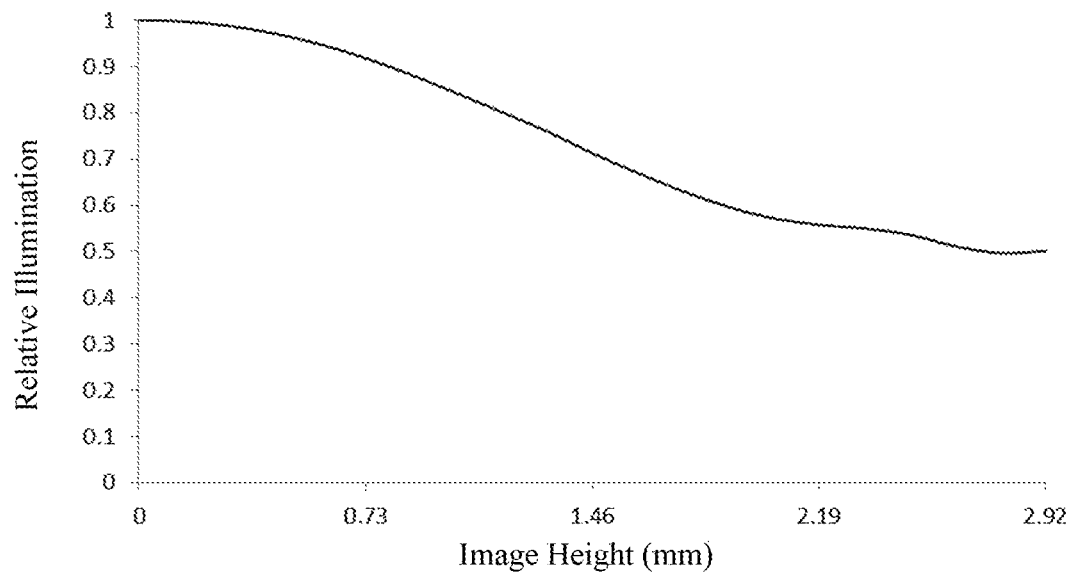

FIG. 6A illustrates an astigmatic curve of the optical imaging system according to example 3, representing a curvature of a tangential plane and a curvature of a sagittal plane. FIG. 6B illustrates a distortion curve of the optical imaging system according to example 3, representing amounts of distortion corresponding to different image heights. FIG. 6C illustrates a relative illumination curve of the optical imaging system according to example 3, representing the relative illumination changes corresponding to different image heights. It can be seen from FIG. 6A to FIG. 6C that the optical imaging system provided in example 3 may achieve good image quality.

Example 4

Figure 7:
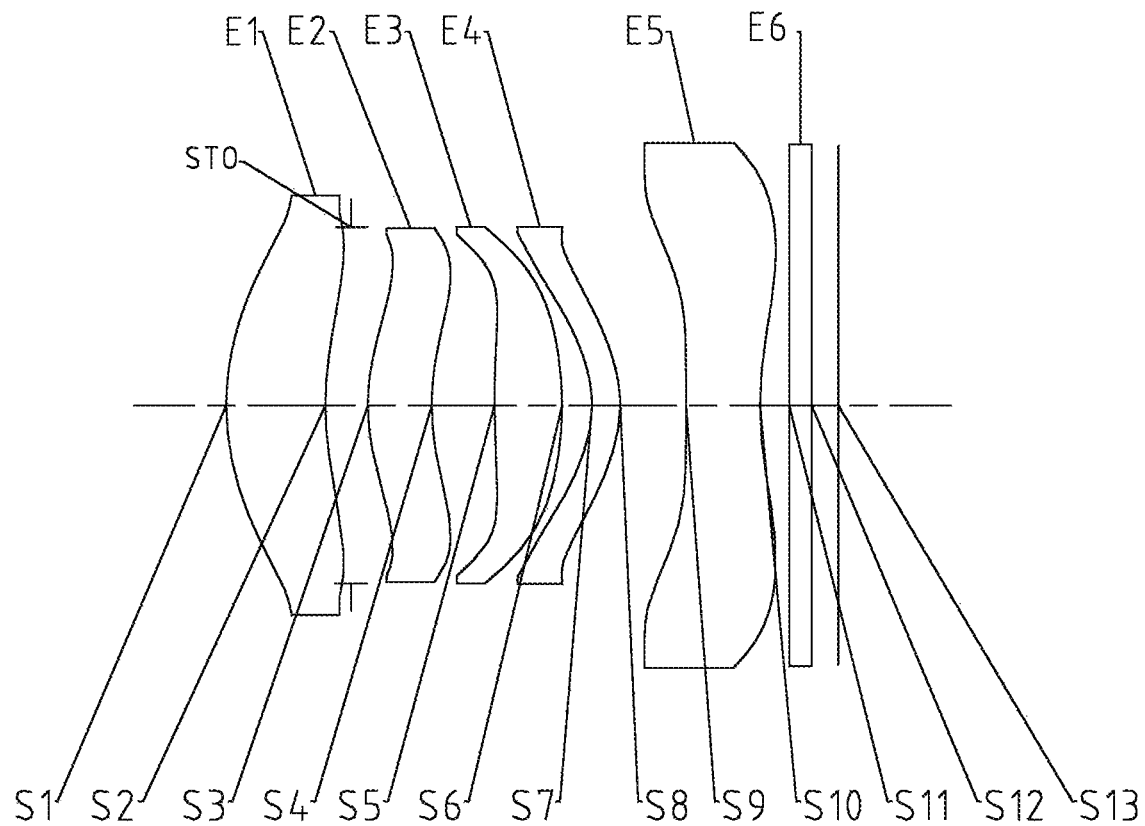
FIG. 7 illustrates a schematic structural view of an optical imaging system according to example 4 of the present disclosure.

An optical imaging system according to example 4 of the present disclosure is described below with reference to FIG. 7 to FIG. 8C. FIG. 7 shows a schematic structural view of the optical imaging system according to example 4 of the present disclosure.

As shown in FIG. 7, the optical imaging system includes a first lens E1, a stop STO, a second lens E2, a third lens E3, a fourth lens E4, a fifth lens E5, an optical filter E6 and an imaging plane S13, which are sequentially arranged from an object side to an image side.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a concave surface. The optical filter E6 has an object-side surface S11 and an image-side surface S12. Light from an object sequentially passes through the respective surfaces S1 to S12 and is finally imaged on the imaging plane S13.

In this example, a total effective focal length f of the optical imaging system is 4.72 mm, a maximum field-of-view FOV of the optical imaging system is 31.4°, and a ratio f/EPD of the total effective focal length f of the optical imaging system to an entrance pupil diameter EPD of the optical imaging system is 1.10.

Table 7 is a table illustrating basic parameters of the optical imaging system of example 4, wherein the units for the radius of curvature, the thickness/distance and the focal length are millimeter (mm). Table 8 shows high-order coefficients applicable to each aspheric surface in example 4, wherein the surface shape of each aspheric surface may be defined by the formula (1) given in the above example 1.

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 462.0000 | | | | |
| S1 | Aspheric | 3.0193 | 1.1110 | 1.633 | 20.4 | 15.60 | −1.6264 |
| S2 | Aspheric | 3.7219 | 0.2878 | | | | −9.0975 |
| STO | Spherical | Infinite | 0.1877 | | | | |
| S3 | Aspheric | 2.4472 | 0.7161 | 1.633 | 20.4 | 14.24 | −11.2799 |
| S4 | Aspheric | 2.9734 | 0.7022 | | | | 0.2000 |
| S5 | Aspheric | 10.4416 | 0.7584 | 1.633 | 20.4 | 4.36 | 19.5987 |
| S6 | Aspheric | −3.6590 | 0.3356 | | | | 0.0000 |
| S7 | Aspheric | −1.3596 | 0.3156 | 1.633 | 20.4 | −199.34 | −1.0000 |
| S8 | Aspheric | −1.4983 | 0.7381 | | | | −1.0560 |
| S9 | Aspheric | −200.0000 | 0.8288 | 1.633 | 20.4 | −6.41 | −99.0000 |
| S10 | Aspheric | 4.1612 | 0.3262 | | | | −2.8552 |

TABLE 7-continued

| Surface number | Surface type | Radius of curvature | Thickness/ Distance | Material Refractive index | Abbe number | Focal length | Conic coefficient |
|---|---|---|---|---|---|---|---|
| S11 | Spherical | Infinite | 0.2520 | 1.517 | 64.2 | | |
| S12 | Spherical | Infinite | 0.2983 | | | | |
| S13 | Spherical | Infinite | | | | | |

TABLE 8

| Surface number | A4 | A6 | A8 | A10 | A12 |
|---|---|---|---|---|---|
| S1 | 1.8300E−03 | 3.9296E−04 | −3.7339E−04 | 1.0651E−04 | −2.2437E−05 |
| S2 | −7.2538E−03 | −1.7920E−03 | 3.5457E−04 | −7.3994E−05 | 6.4514E−06 |
| S3 | 5.6732E−02 | −6.6156E−02 | 4.3710E−02 | −2.4313E−02 | 9.4852E−03 |
| S4 | −1.8931E−02 | −1.2250E−02 | 2.3051E−03 | −1.3337E−03 | 4.6909E−04 |
| S5 | −2.0450E−02 | 2.8362E−02 | −5.9732E−02 | 5.4588E−02 | −2.9799E−02 |
| S6 | 3.1584E−02 | −6.0234E−02 | 6.4129E−02 | −5.2025E−02 | 2.6573E−02 |
| S7 | 1.5361E−01 | −1.6293E−01 | 1.1982E−01 | −5.9354E−02 | 2.0595E−02 |
| S8 | 1.3183E−01 | −1.3914E−01 | 1.1425E−01 | −7.0080E−02 | 3.3392E−02 |
| S9 | −3.3533E−03 | −3.2256E−02 | 1.7594E−02 | −5.0780E−03 | 9.6213E−04 |
| S10 | −9.5186E−03 | −8.9574E−03 | 3.6168E−03 | −7.026 IE−04 | 7.6863E−05 |

| Surface number | A14 | A16 | A18 | A20 |
|---|---|---|---|---|
| S1 | 1.3216E−06 | 0.0000E+00 | 0.0000E+00 | 0.0000E+00 |
| S2 | 0.0000E+00 | 0.0000E+00 | 0.0000E+00 | 0.0000E+00 |
| S3 | −2.3110E−03 | 3.1559E−04 | −1.8760E−05 | 0.0000E+00 |
| S4 | 1.0965E−04 | −1.1075E−04 | 2.5390E−05 | −1.9383E−06 |
| S5 | 9.0650E−03 | −1.4054E−03 | 8.6929E−05 | 0.0000E+00 |
| S6 | −8.2964E−03 | 1.5416E−03 | −1.5613E−04 | 6.6077E−06 |
| S7 | −4.6661E−03 | 6.1494E−04 | −3.9593E−05 | 7.9702E−07 |
| S8 | −1.1451E−02 | 2.5455E−03 | −3.2132E−04 | 1.7373E−05 |
| S9 | −1.1995E−04 | 9.3086E−06 | −4.0346E−07 | 7.4161E−09 |
| S10 | −4.9594E−06 | 1.8699E−07 | −3.8081E−09 | 3.2346E−11 |

Figure 8A:
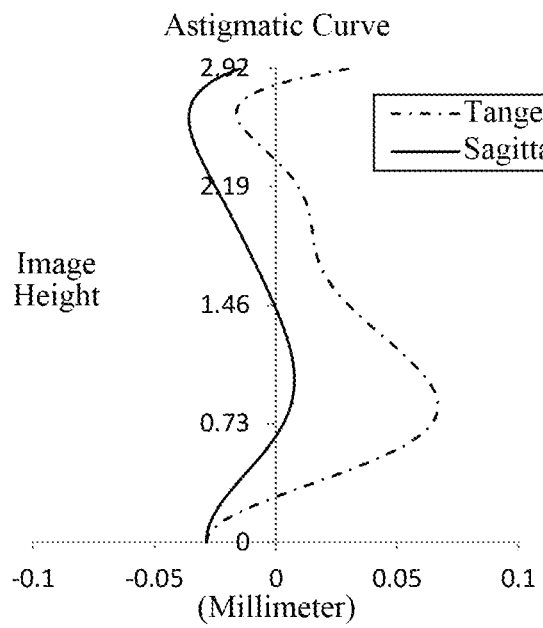
FIGS. 8A to 8C illustrate an astigmatic curve, a distortion curve, and a relative illumination curve of the optical imaging system of the example 4, respectively.
Figure 8B:
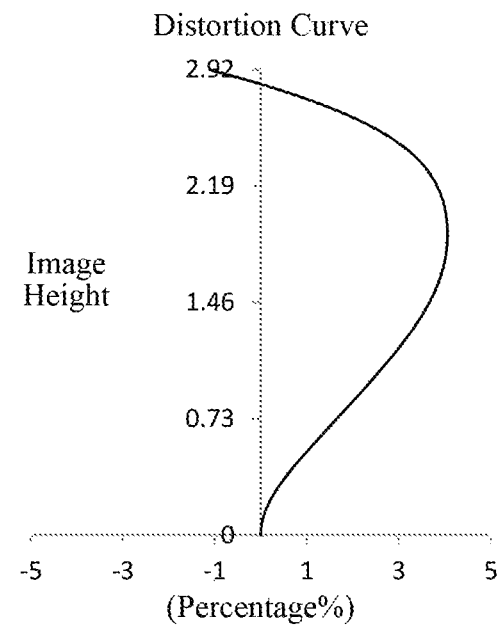
Figure 8C:
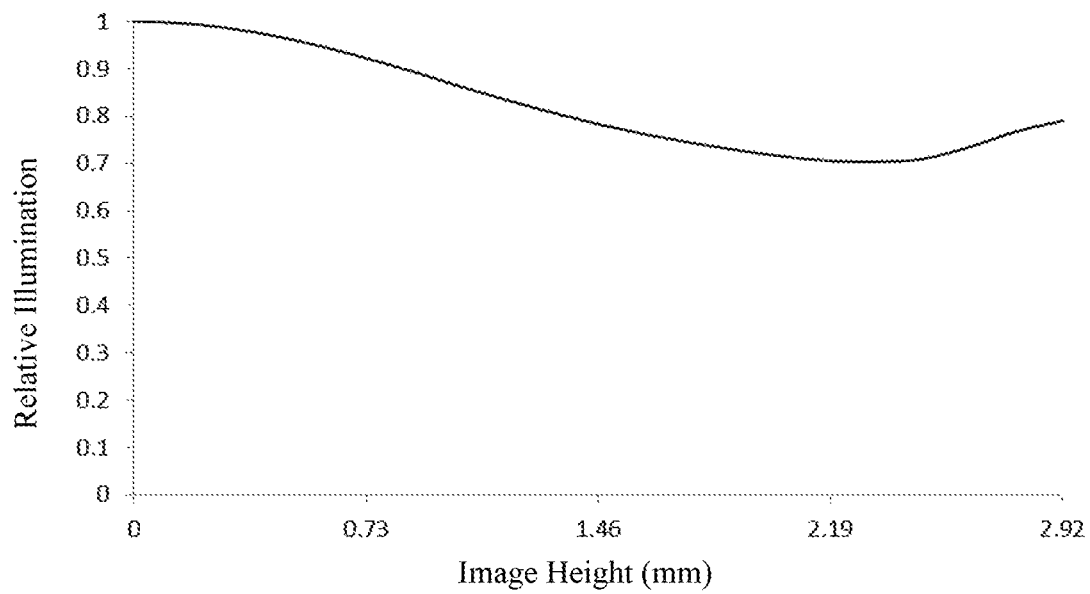

FIG. 8A illustrates an astigmatic curve of the optical imaging system according to example 4, representing a curvature of a tangential plane and a curvature of a sagittal plane. FIG. 8B illustrates a distortion curve of the optical imaging system according to example 4, representing amounts of distortion corresponding to different image heights. FIG. 8C illustrates a relative illumination curve of the optical imaging system according to example 4, representing the relative illumination changes corresponding to different image heights. It can be seen from FIG. 8A to FIG. 8C that the optical imaging system provided in example 4 may achieve good image quality.

Example 5

Figure 9:
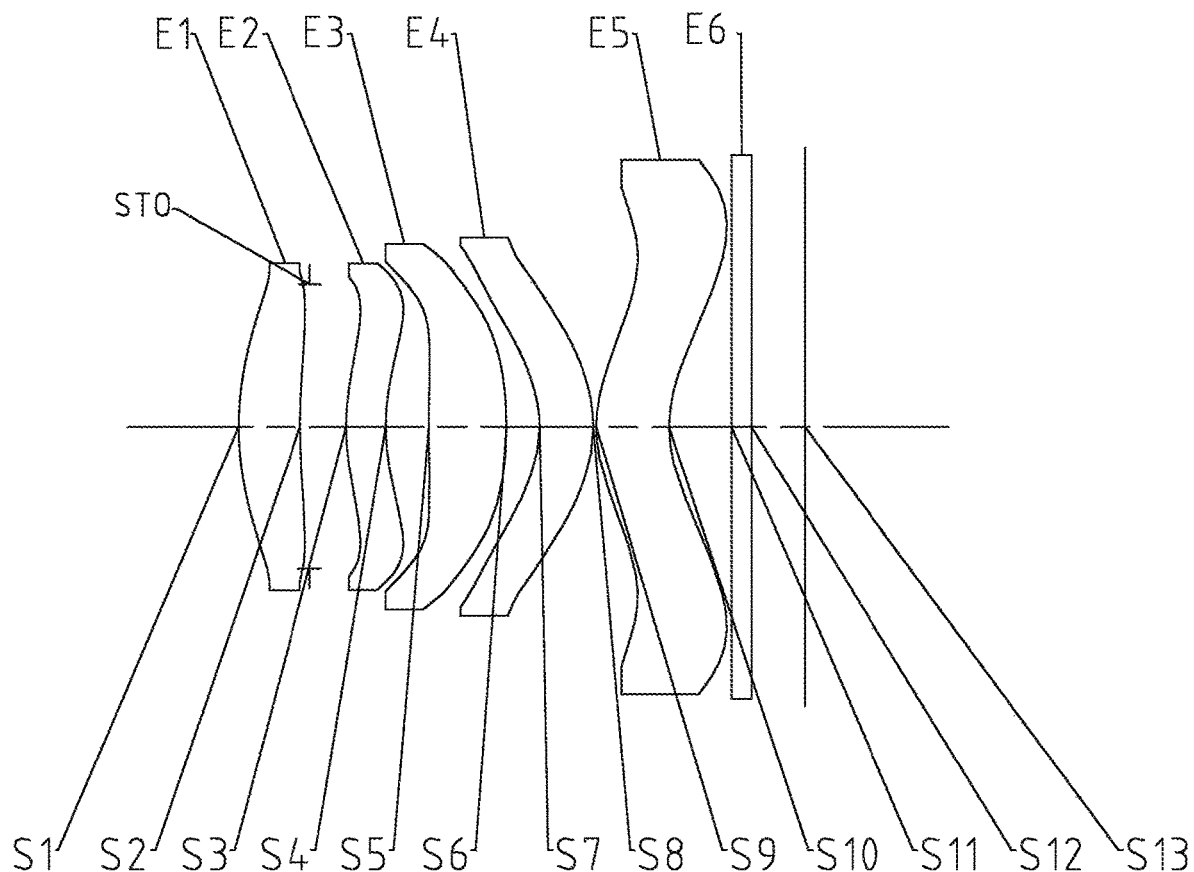
FIG. 9 illustrates a schematic structural view of an optical imaging system according to example 5 of the present disclosure.

An optical imaging system according to example 5 of the present disclosure is described below with reference to FIG. 9 to FIG. 10C. FIG. 9 shows a schematic structural view of the optical imaging system according to example 5 of the present disclosure.

As shown in FIG. 9, the optical imaging system includes a first lens E1, a stop STO, a second lens E2, a third lens E3, a fourth lens E4, a fifth lens E5, an optical filter E6 and an imaging plane S13, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a concave surface. The optical filter E6 has an object-side surface S11 and an image-side surface S12. Light from an object sequentially passes through the respective surfaces S1 to S12 and is finally imaged on the imaging plane S13.

In this example, a total effective focal length f of the optical imaging system is 3.46 mm, a maximum field-of-view FOV of the optical imaging system is 39.2°, and a ratio f/EPD of the total effective focal length f of the optical imaging system to an entrance pupil diameter EPD of the optical imaging system is 1.12.

Table 9 is a table illustrating basic parameters of the optical imaging system of example 5, wherein the units for the radius of curvature, the thickness/distance and the focal length are millimeter (mm). Table 10 shows high-order coefficients applicable to each aspheric surface in example 5, wherein the surface shape of each aspheric surface may be defined by the formula (1) given in the above example 1.

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 3.2934 | 0.6489 | 1.633 | 20.4 | 9.25 | −2.8460 |
| S2 | Aspheric | 6.9183 | 0.0993 | | | | −13.0668 |
| STO | Spherical | Infinite | 0.3833 | | | | |
| S3 | Aspheric | 2.5366 | 0.4160 | 1.633 | 20.4 | −200.00 | −18.2638 |
| S4 | Aspheric | 2.3285 | 0.4516 | | | | −0.0265 |
| S5 | Aspheric | 14.0319 | 0.8135 | 1.633 | 20.4 | 5.00 | 54.2294 |
| S6 | Aspheric | −4.0126 | 0.3501 | | | | 0.0000 |
| S7 | Aspheric | −1.2360 | 0.5690 | 1.633 | 20.4 | −50.00 | −1.0000 |
| S8 | Aspheric | −1.5160 | 0.0300 | | | | −0.8269 |
| S9 | Aspheric | 1.4596 | 0.7626 | 1.633 | 20.4 | 13.26 | −3.8440 |
| S10 | Aspheric | 1.4073 | 0.6558 | | | | −1.4444 |
| S11 | Spherical | Infinite | 0.2100 | 1.517 | 64.2 | | |
| S12 | Spherical | Infinite | 0.5599 | | | | |
| S13 | Spherical | Infinite | | | | | |

TABLE 10

| Surface number | A4 | A6 | A8 | A10 | A12 |
|---|---|---|---|---|---|
| S1 | 3.2366E−03 | −4.9352E−03 | 5.9036E−03 | −4.3624E−03 | 1.3872E−03 |
| S2 | −2.4942E−02 | 6.0576E−03 | −2.7588E−03 | 4.2321E−04 | −7.4232E−05 |
| S3 | 6.1862E−02 | −1.2063E−01 | 9.7444E−02 | −5.4053E−02 | 1.5949E−02 |
| S4 | −5.9602E−02 | −8.1883E−04 | −1.0067E−02 | 4.0904E−02 | 2.8189E−03 |
| S5 | −3.4503E−02 | 1.7260E−02 | −5.7776E−02 | 6.7559E−02 | −5.1313E−02 |
| S6 | −1.6898E−02 | −3.5587E−02 | 2.5355E−02 | −5.7326E−03 | −6.4011E−03 |
| S7 | 2.2561E−01 | −3.1770E−01 | 3.1017E−01 | −2.0397E−01 | 9.3961E−02 |
| S8 | 5.7568E−02 | −5.2783E−02 | 4.4861E−02 | −2.0593E−02 | 4.9473E−03 |
| S9 | −2.5803E−02 | 9.6335E−03 | −7.6205E−03 | 3.2112E−03 | −8.6178E−04 |
| S10 | −9.4584E−02 | 4.6252E−02 | −2.1156E−02 | 6.9440E−03 | −1.5424E−03 |

| Surface number | A14 | A16 | A18 | A20 |
|---|---|---|---|---|
| S1 | −1.8762E−04 | 0.0000E+00 | 0.0000E+00 | 0.0000E+00 |
| S2 | 0.0000E+00 | 0.0000E+00 | 0.0000E+00 | 0.0000E+00 |
| S3 | −6.0184E−04 | −9.2419E−04 | 1.6302E−04 | 0.0000E+00 |
| S4 | −4.2747E−03 | 1.8168E−03 | −3.2665E−04 | 2.2301E−05 |
| S5 | 2.1496E−02 | −4.4237E−03 | 3.5165E−04 | 0.0000E+00 |
| S6 | 6.7245E−03 | −2.5784E−03 | 4.4888E−04 | −2.9756E−05 |
| S7 | −2.8261E−02 | 4.9446E−03 | −4.2265E−04 | 1.1295E−05 |
| S8 | −1.4908E−04 | −2.5274E−04 | 5.9941E−05 | −4.1719E−06 |
| S9 | 1.4342E−04 | −1.3017E−05 | 4.9601E−07 | −1.0730E−09 |
| S10 | 2.2256E−04 | −1.9914E−05 | 1.0048E−06 | −2.1885E−08 |

Figures 10A, 10B:
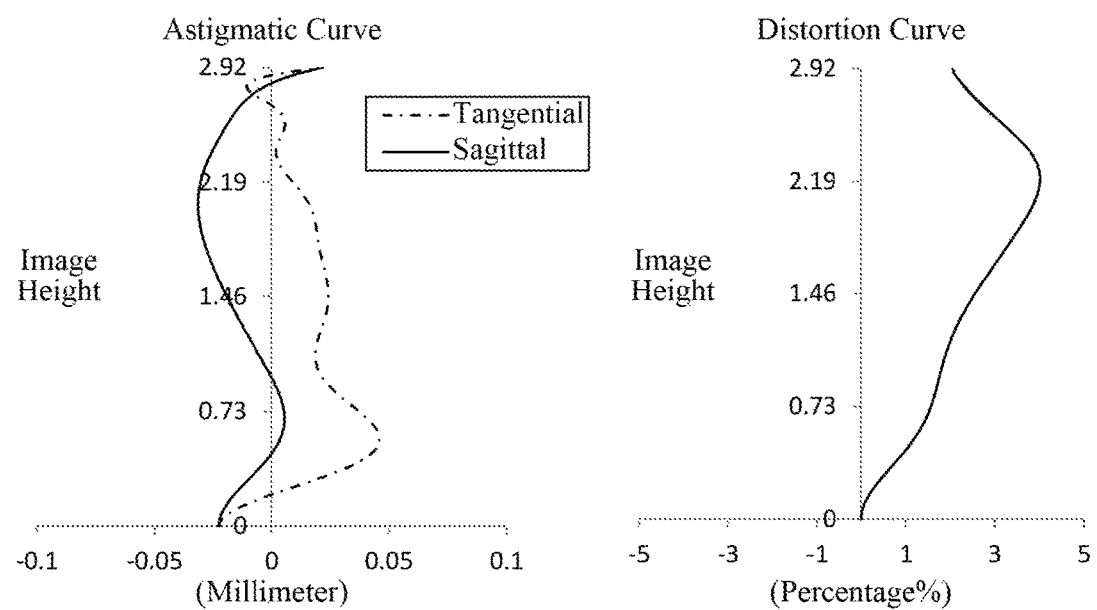
FIGS. 10A to 10C illustrate an astigmatic curve, a distortion curve, and a relative illumination curve of the optical imaging system of the example 5, respectively.
Figure 10C:
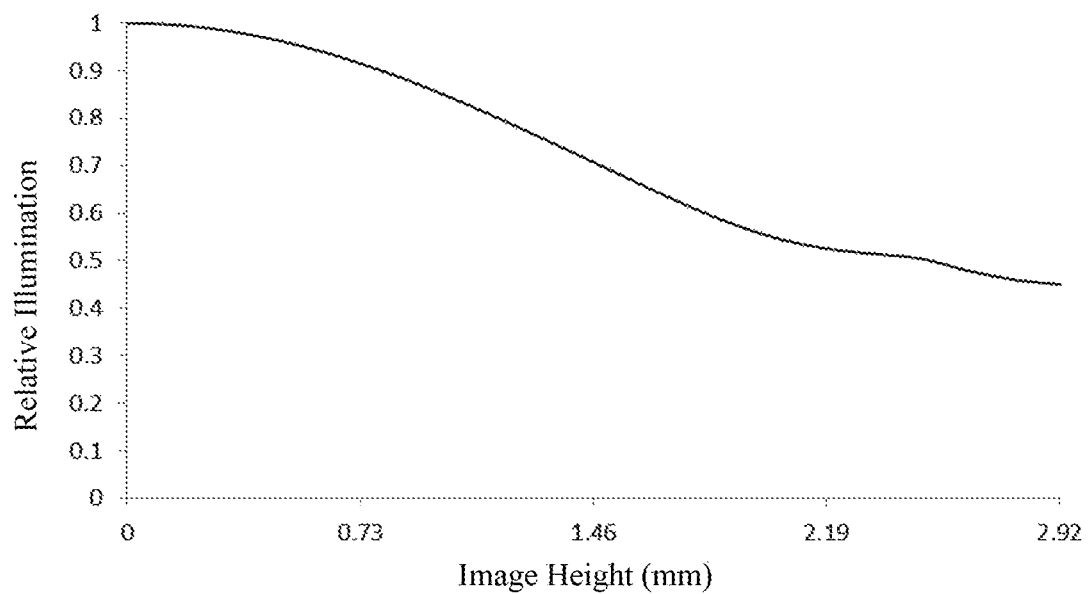

FIG. 10A illustrates an astigmatic curve of the optical imaging system according to example 5, representing a curvature of a tangential plane and a curvature of a sagittal plane. FIG. 10B illustrates a distortion curve of the optical imaging system according to example 5, representing amounts of distortion corresponding to different image heights. FIG. 10C illustrates a relative illumination curve of the optical imaging system according to example 5, representing the relative illumination changes corresponding to different image heights. It can be seen from FIG. 10A to FIG. 10C that the optical imaging system provided in example 5 may achieve good image quality.

Example 6

Figure 11:
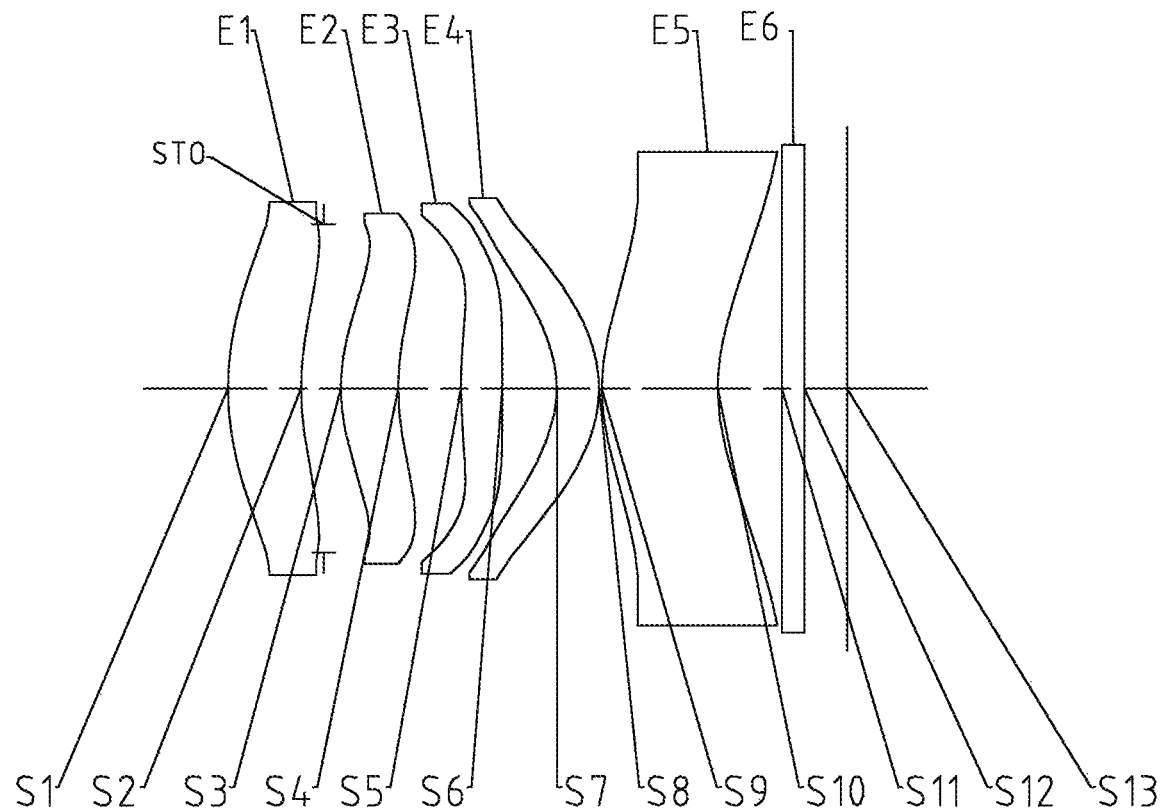
FIG. 11 illustrates a schematic structural view of an optical imaging system according to example 6 of the present disclosure.

An optical imaging system according to example 6 of the present disclosure is described below with reference to FIG. 11 to FIG. 12C. FIG. 11 shows a schematic structural view of the optical imaging system according to example 6 of the present disclosure.

As shown in FIG. 11, the optical imaging system includes a first lens E1, a stop STO, a second lens E2, a third lens E3, a fourth lens E4, a fifth lens E5, an optical filter E6 and an imaging plane S13, which are sequentially arranged from an object side to an image side.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a concave surface. The optical filter E6 has an object-side surface S11 and an image-side surface S12. Light from an object sequentially passes through the respective surfaces S1 to S12 and is finally imaged on the imaging plane S13.

In this example, a total effective focal length f of the optical imaging system is 4.23 mm, a maximum field-of-view FOV of the optical imaging system is 33.1°, and a ratio f/EPD of the total effective focal length f of the optical imaging system to an entrance pupil diameter EPD of the optical imaging system is 1.11.

Table 11 is a table illustrating basic parameters of the optical imaging system of example 6, wherein the units for the radius of curvature, the thickness/distance and the focal length are millimeter (mm). Table 12 shows high-order coefficients applicable to each aspheric surface in example 6, wherein the surface shape of each aspheric surface may be defined by the formula (1) given in the above example 1.

FIG. 12A illustrates an astigmatic curve of the optical imaging system according to example 6, representing a curvature of a tangential plane and a curvature of a sagittal plane. FIG. 12B illustrates a distortion curve of the optical imaging system according to example 6, representing amounts of distortion corresponding to different image heights. FIG. 12C illustrates a relative illumination curve of the optical imaging system according to example 6, representing the relative illumination changes corresponding to different image heights. It can be seen from FIG. 12A to FIG. 12C that the optical imaging system provided in example 6 may achieve good image quality.

Example 7

An optical imaging system according to example 7 of the present disclosure is described below with reference to FIG.

TABLE 11

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 3.2333 | 0.8148 | 1.633 | 20.4 | 65.56 | −2.9842 |
| S2 | Aspheric | 3.1623 | 0.2521 | | | | −10.9425 |
| STO | Spherical | Infinite | 0.1921 | | | | 0.0000 |
| S3 | Aspheric | 2.1980 | 0.6400 | 1.633 | 20.4 | 9.61 | −9.1978 |
| S4 | Aspheric | 3.0471 | 0.6980 | | | | 0.1157 |
| S5 | Aspheric | 5.6234 | 0.4619 | 1.633 | 20.4 | 9.10 | −15.0065 |
| S6 | Aspheric | 200.0000 | 0.6090 | | | | 0.0000 |
| S7 | Aspheric | −1.2910 | 0.4701 | 1.633 | 20.4 | −174.61 | −1.0000 |
| S8 | Aspheric | −1.4910 | 0.0300 | | | | −0.9077 |
| S9 | Aspheric | 2.2195 | 1.2932 | 1.633 | 20.4 | 14.49 | −3.3823 |
| S10 | Aspheric | 2.2630 | 0.7161 | | | | −1.5368 |
| S11 | Spherical | Infinite | 0.2520 | 1.517 | 64.2 | | |
| S12 | Spherical | Infinite | 0.4753 | | | | |
| S13 | Spherical | Infinite | | | | | |

TABLE 12

| Surface number | A4 | A6 | A8 | A10 | A12 |
|---|---|---|---|---|---|
| S1 | −1.6915E−03 | 1.1267E−03 | 3.6872E−05 | −3.4068E−04 | 8.9751E−05 |
| S2 | −8.8037E−03 | 9.8016E−05 | −7.6911E−04 | 1.0749E−04 | −5.7102E−06 |
| S3 | 5.4299E−02 | −6.7967E−02 | 5.5842E−02 | −3.8649E−02 | 1.8702E−02 |
| S4 | −2.9896E−02 | −1.0390E−02 | 1.1225E−02 | −1.2649E−02 | 8.9103E−03 |
| S5 | −2.5177E−02 | 2.2335E−02 | −6.4779E−02 | 6.5803E−02 | −3.9183E−02 |
| S6 | −1.4690E−02 | −9.6328E−03 | −1.1459E−02 | 1.7397E−02 | −1.2685E−02 |
| S7 | 1.6336E−01 | −1.7870E−01 | 1.3552E−01 | −6.9228E−02 | 2.4773E−02 |
| S8 | 4.7768E−02 | −4.5260E−02 | 3.0879E−02 | −1.2440E−02 | 3.3522E−03 |
| S9 | −5.2572E−02 | 2.9868E−02 | −1.2278E−02 | 3.1431E−03 | −5.0611E−04 |
| S10 | −5.0726E−02 | 2.0854E−02 | −6.7144E−03 | 1.4533E−03 | −2.0500E−04 |

| Surface number | A14 | A16 | A18 | A20 |
|---|---|---|---|---|
| S1 | −8.8359E−06 | 0.0000E+00 | 0.0000E+00 | 0.0000E+00 |
| S2 | 0.0000E+00 | 0.0000E+00 | 0.0000E+00 | 0.0000E+00 |
| S3 | −5.7910E−03 | 1.0177E−03 | −7.6884E−05 | 0.0000E+00 |
| S4 | −3.9431E−03 | 1.0610E−03 | −1.5694E−04 | 9.6521E−06 |
| S5 | 1.3280E−02 | −2.3146E−03 | 1.6023E−04 | 0.0000E+00 |
| S6 | 5.5130E−03 | −1.3453E−03 | 1.6766E−04 | −8.2885E−06 |
| S7 | −5.7879E−03 | 7.8663E−04 | −5.2231E−05 | 1.0843E−06 |
| S8 | −5.7262E−04 | 4.4529E−05 | 1.3176E−06 | −3.0141E−07 |
| S9 | 5.0895E−05 | −3.0810E−06 | 1.0244E−07 | −1.4374E−09 |
| S10 | 1.8483E−05 | −1.0253E−06 | 3.1803E−08 | −4.2098E−10 |

Figure 14C:
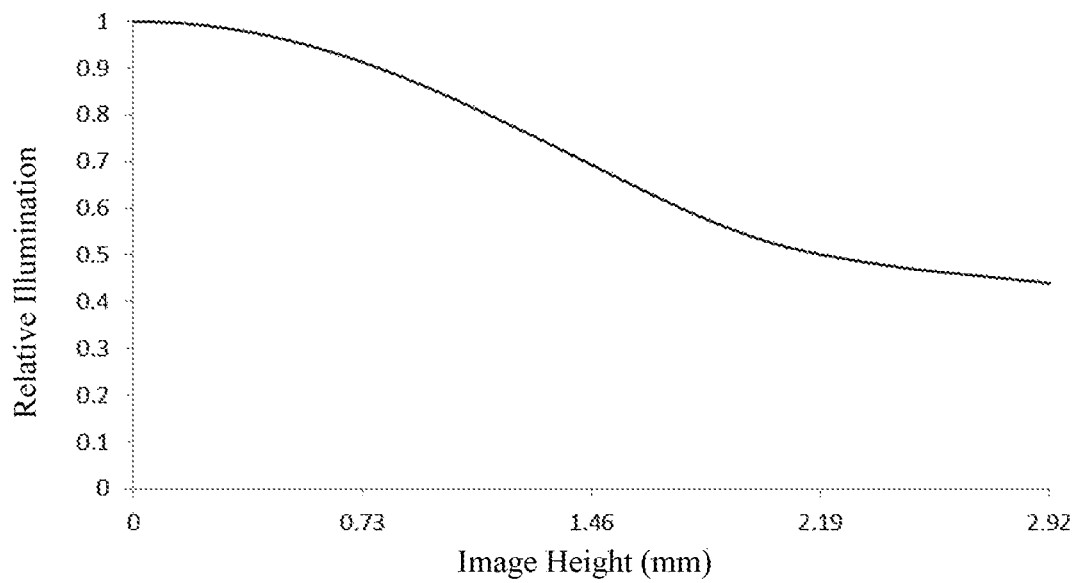

13 to FIG. 14C. FIG. 13 shows a schematic structural view of the optical imaging system according to example 7 of the present disclosure.

As shown in FIG. 13, the optical imaging system includes a first lens E1, a stop STO, a second lens E2, a third lens E3, a fourth lens E4, a fifth lens E5, an optical filter E6 and an imaging plane S13, which are sequentially arranged from an object side to an image side.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has positive refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a concave surface. The optical filter E6 has an object-side surface S11 and an image-side surface S12. Light from an object sequentially passes through the respective surfaces S1 to S12 and is finally imaged on the imaging plane S13.

In this example, a total effective focal length f of the optical imaging system is 3.41 mm, a maximum field-of-view FOV of the optical imaging system is 39.1°, and a ratio f/EPD of the total effective focal length f of the optical imaging system to an entrance pupil diameter EPD of the optical imaging system is 1.11.

Table 13 is a table illustrating basic parameters of the optical imaging system of example 7, wherein the units for the radius of curvature, the thickness/distance and the focal length are millimeter (mm). Table 14 shows high-order coefficients applicable to each aspheric surface in example 7, wherein the surface shape of each aspheric surface may be defined by the formula (1) given in the above example 1.

TABLE 13

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 462.0000 | | | | |
| S1 | Aspheric | 2.9263 | 0.5702 | 1.633 | 20.4 | 15.72 | −3.0243 |
| S2 | Aspheric | 3.8265 | 0.1488 | | | | −13.3118 |
| STO | Spherical | Infinite | 0.2406 | | | | 0.0000 |
| S3 | Aspheric | 2.1739 | 0.4968 | 1.633 | 20.4 | 15.13 | −15.6251 |
| S4 | Aspheric | 2.5602 | 0.5084 | | | | −0.2470 |
| S5 | Aspheric | 130.8917 | 0.5766 | 1.633 | 20.4 | 5.69 | −72.7368 |
| S6 | Aspheric | −3.7081 | 0.5223 | | | | 0.0000 |
| S7 | Aspheric | −1.1825 | 0.4189 | 1.633 | 20.4 | 123.09 | −1.0000 |
| S8 | Aspheric | −1.3252 | 0.0300 | | | | −0.9754 |
| S9 | Aspheric | 1.5640 | 0.7711 | 1.633 | 20.4 | 25.79 | −2.6997 |
| S10 | Aspheric | 1.3979 | 0.5708 | | | | −1.7275 |
| S11 | Spherical | Infinite | 0.2100 | 1.517 | 64.2 | | |
| S12 | Spherical | Infinite | 0.5354 | | | | |
| S13 | Spherical | Infinite | | | | | |

TABLE 14

| Surface number | A4 | A6 | A8 | A10 | A12 |
|---|---|---|---|---|---|
| S1 | −2.4613E−03 | −1.6420E−03 | 6.0272E−03 | −5.4214E−03 | 1.8742E−03 |
| S2 | −3.4585E−02 | 1.3326E−02 | −6.8073E−03 | 1.7932E−03 | −2.6699E−04 |
| S3 | 9.7851E−02 | −1.9451E−01 | 1.9483E−01 | −1.5626E−01 | 9.0621E−02 |
| S4 | −5.3008E−02 | 1.2296E−02 | −8.1594E−02 | 1.0500E−01 | −7.5144E−02 |
| S5 | −4.4861E−02 | −2.6632E−02 | 4.0258E−02 | −8.0469E−02 | 6.6197E−02 |
| S6 | −2.7303E−02 | −6.5812E−02 | 1.2920E−01 | −1.6136E−01 | 1.2267E−01 |
| S7 | 2.5486E−01 | −3.5249E−01 | 3.6629E−01 | −2.4719E−01 | 1.2005E−01 |
| S8 | 6.9125E−02 | −4.3718E−02 | 2.0321E−02 | 6.6322E−03 | −1.1294E−02 |
| S9 | −1.1932E−01 | 9.4479E−02 | −6.6964E−02 | 3.2376E−02 | −1.0550E−02 |
| S10 | −1.2949E−01 | 8.7591E−02 | −4.8776E−02 | 1.8942E−02 | −4.9485E−03 |

| Surface number | A14 | A16 | A18 | A20 |
|---|---|---|---|---|
| S1 | −2.5895E−04 | 0.0000E+00 | 0.0000E+00 | 0.0000E+00 |
| S2 | 0.0000E+00 | 0.0000E+00 | 0.0000E+00 | 0.0000E+00 |
| S3 | −3.5215E−02 | 8.0871E−03 | −8.3329E−04 | 0.0000E+00 |
| S4 | 3.0345E−02 | −6.3545E−03 | 5.0164E−04 | 1.0328E−05 |
| S5 | −2.5408E−02 | 4.6159E−03 | −3.1700E−04 | 0.0000E+00 |
| S6 | −5.4072E−02 | 1.3542E−02 | −1.7932E−03 | 9.7418E−05 |
| S7 | −4.1612E−02 | 9.2971E−03 | −1.1542E−03 | 5.9311E−05 |
| S8 | 6.1939E−03 | −2.0148E−03 | 3.6834E−04 | −2.7795E−05 |
| S9 | 2.2385E−03 | −2.9201E−04 | 2.1165E−05 | −6.5180E−07 |
| S10 | 8.4375E−04 | −8.9744E−05 | 5.4013E−06 | −1.4038E−07 |

FIG. 14A illustrates an astigmatic curve of the optical imaging system according to example 7, representing a curvature of a tangential plane and a curvature of a sagittal plane. FIG. 14B illustrates a distortion curve of the optical imaging system according to example 7, representing amounts of distortion corresponding to different image heights. FIG. 14C illustrates a relative illumination curve of the optical imaging system according to example 7, representing the relative illumination changes corresponding to different image heights. It can be seen from FIG. 14A to FIG. 14C that the optical imaging system provided in example 7 may achieve good image quality.

Example 8

Figure 15:
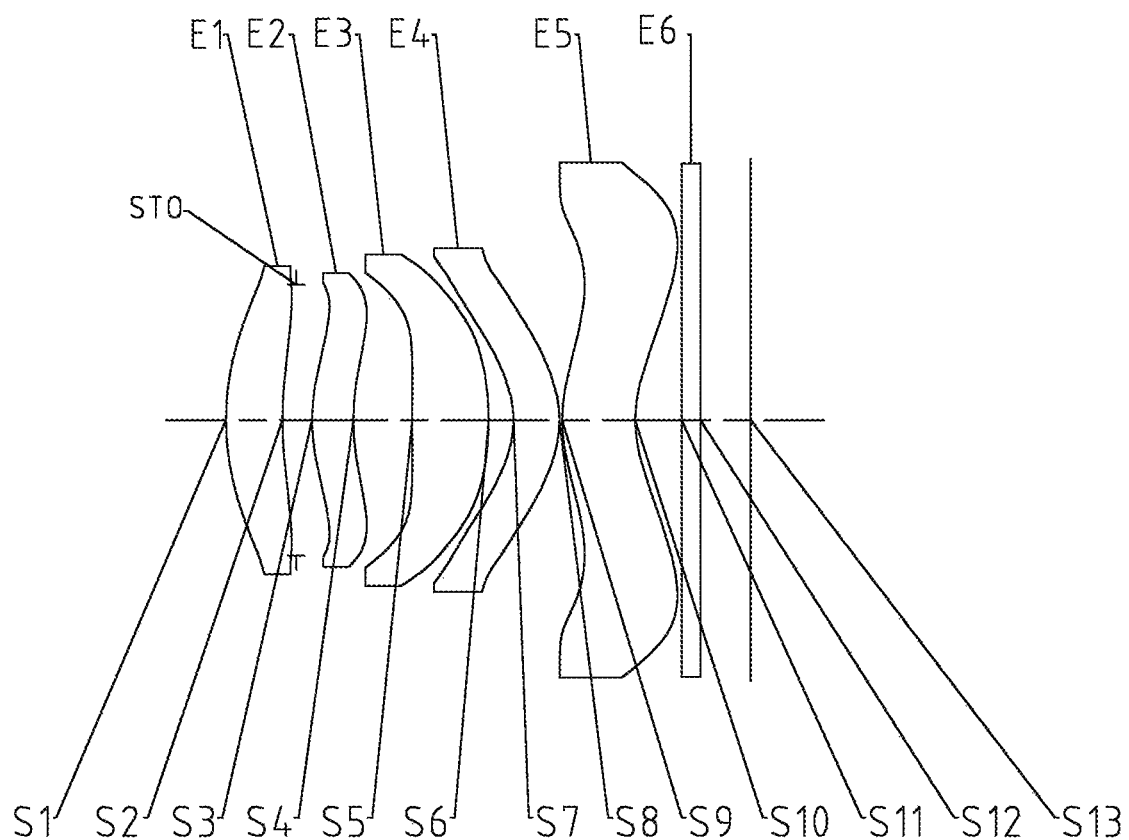
FIG. 15 illustrates a schematic structural view of an optical imaging system according to example 8 of the present disclosure.

An optical imaging system according to example 8 of the present disclosure is described below with reference to FIG. 15 to FIG. 16C. FIG. 15 shows a schematic structural view of the optical imaging system according to example 8 of the present disclosure.

As shown in FIG. 15, the optical imaging system includes a first lens E1, a stop STO, a second lens E2, a third lens E3, a fourth lens E4, a fifth lens E5, an optical filter E6 and an imaging plane S13, which are sequentially arranged from an object side to an image side.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a concave surface, and an image-side surface S8 thereof is a convex surface. The fifth lens E5 has negative refractive power, an object-side surface S9 thereof is a convex surface, and an image-side surface S10 thereof is a concave surface. The optical filter E6 has an object-side surface S11 and an image-side surface S12. Light from an object sequentially passes through the respective surfaces S1 to S12 and is finally imaged on the imaging plane S13.

In this example, a total effective focal length f of the optical imaging system is 3.52 mm, a maximum field-of-view FOV of the optical imaging system is 39.2°, and a ratio f/EPD of the total effective focal length f of the optical imaging system to an entrance pupil diameter EPD of the optical imaging system is 1.11.

Table 15 is a table illustrating basic parameters of the optical imaging system of example 8, wherein the units for the radius of curvature, the thickness/distance and the focal length are millimeter (mm). Table 16 shows high-order coefficients applicable to each aspheric surface in example 8, wherein the surface shape of each aspheric surface may be defined by the formula (1) given in the above example 1.

TABLE 15

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 2.8934 | 0.6297 | 1.633 | 20.4 | 13.23 | −2.1153 |
| S2 | Aspheric | 4.0400 | 0.1549 | | | | −12.4496 |
| STO | Spherical | Infinite | 0.1761 | | | | |
| S3 | Aspheric | 2.1721 | 0.4599 | 1.633 | 20.4 | 13.49 | −13.9944 |
| S4 | Aspheric | 2.6700 | 0.6576 | | | | 0.1757 |
| S5 | Aspheric | 29.1520 | 0.8517 | 1.633 | 20.4 | 4.70 | 78.4772 |
| S6 | Aspheric | −3.2852 | 0.2773 | | | | 0.0000 |
| S7 | Aspheric | −1.0918 | 0.5113 | 1.633 | 20.4 | −200.01 | −1.0000 |
| S8 | Aspheric | −1.3016 | 0.0300 | | | | −0.9553 |
| S9 | Aspheric | 1.7787 | 0.8131 | 1.633 | 20.4 | −200.01 | −3.1734 |
| S10 | Aspheric | 1.4427 | 0.5196 | | | | −1.7073 |
| S11 | Spherical | Infinite | 0.2100 | 1.517 | 64.2 | | |
| S12 | Spherical | Infinite | 0.5601 | | | | |
| S13 | Spherical | Infinite | | | | | |

TABLE 16

| Surface number | A4 | A6 | A8 | A10 | A12 |
|---|---|---|---|---|---|
| S1 | −7.5713E−04 | −7.7955E−04 | 3.8350E−03 | −3.2947E−03 | 1.0908E−03 |
| S2 | −3.4987E−02 | 1.4008E−02 | −5.7753E−03 | 1.3383E−03 | −1.8418E−04 |
| S3 | 8.5478E−02 | −1.5698E−01 | 1.4860E−01 | −1.2007E−01 | 7.4943E−02 |
| S4 | −4.0448E−02 | −1.3058E−02 | −2.1118E−02 | 2.7233E−02 | −1.4706E−02 |
| S5 | −4.1784E−02 | 4.8021E−02 | −1.4809E−01 | 2.0004E−01 | −1.6855E−01 |
| S6 | 4.6157E−03 | −1.0783E−01 | 1.5952E−01 | −1.7167E−01 | 1.2106E−01 |
| S7 | 2.6981E−01 | −4.1549E−01 | 4.4362E−01 | −3.1902E−01 | 1.6071E−01 |
| S8 | 1.1873E−01 | −1.4167E−01 | 1.3668E−01 | −8.2661E−02 | 3.4341E−02 |
| S9 | −8.0696E−02 | 2.6514E−02 | −3.7384E−03 | −3.1365E−03 | 2.1005E−03 |
| S10 | −1.2775E−01 | 7.9161E−02 | −3.9546E−02 | 1.3747E−02 | −3.2018E−03 |

TABLE 16-continued

| Surface number | A14 | A16 | A18 | A20 |
|---|---|---|---|---|
| S1 | −1.4691E−04 | 0.0000E+00 | 0.0000E+00 | 0.0000E+00 |
| S2 | 0.0000E+00 | 0.0000E+00 | 0.0000E+00 | 0.0000E+00 |
| S3 | −3.1945E−02 | 7.9425E−03 | −8.6400E−04 | 0.0000E+00 |
| S4 | 2.5223E−03 | 8.3761E−04 | −4.1234E−04 | 4.7582E−05 |
| S5 | 8.0066E−02 | −1.9262E−02 | 1.8255E−03 | 0.0000E+00 |
| S6 | −5.2100E−02 | 1.3251E−02 | −1.8440E−03 | 1.0876E−04 |
| S7 | −5.2863E−02 | 1.0114E−02 | −9.4546E−04 | 2.7631E−05 |
| S8 | −1.0158E−02 | 2.0509E−03 | −2.5431E−04 | 1.4934E−05 |
| S9 | −5.9659E−04 | 9.1594E−05 | −7.3441E−06 | 2.4037E−07 |
| S10 | 4.8266E−04 | −4.5056E−05 | 2.3630E−06 | −5.3023E−08 |

FIG. 16A illustrates an astigmatic curve of the optical imaging system according to example 8, representing a curvature of a tangential plane and a curvature of a sagittal plane. FIG. 16B illustrates a distortion curve of the optical imaging system according to example 8, representing amounts of distortion corresponding to different image heights. FIG. 16C illustrates a relative illumination curve of the optical imaging system according to example 8, representing the relative illumination changes corresponding to different image heights. It can be seen from FIG. 16A to FIG. 16C that the optical imaging system provided in example 8 may achieve good image quality.

Example 9

An optical imaging system according to example 9 of the present disclosure is described below with reference to FIG. 17 to FIG. 18C. FIG. 17 shows a schematic structural view of the optical imaging system according to example 9 of the present disclosure.

As shown in FIG. 17, the optical imaging system includes a first lens E1, a stop STO, a second lens E2, a third lens E3, a fourth lens E4, a fifth lens E5, an optical filter E6 and an imaging plane S13, which are sequentially arranged from an object side to an image side.

The first lens E1 has negative refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a concave surface. The third lens E3 has positive refractive power, an object-side surface S5 thereof is a concave surface, and an image-side surface S6 thereof is a convex surface. The fourth lens E4 has negative refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a convex surface. The optical filter E6 has an object-side surface S11 and an image-side surface S12. Light from an object sequentially passes through the respective surfaces S1 to S12 and is finally imaged on the imaging plane S13.

In this example, a total effective focal length f of the optical imaging system is 4.11 mm, a maximum field-of-view FOV of the optical imaging system is 33.9°, and a ratio f/EPD of the total effective focal length f of the optical imaging system to an entrance pupil diameter EPD of the optical imaging system is 1.12.

Table 17 is a table illustrating basic parameters of the optical imaging system of example 9, wherein the units for the radius of curvature, the thickness/distance and the focal length are millimeter (mm). Table 18 shows high-order coefficients applicable to each aspheric surface in example 9, wherein the surface shape of each aspheric surface may be defined by the formula (1) given in the above example 1.

TABLE 17

| Surface number | Surface type | Radius of curvature | Thickness/ Distance | Material | | Focal length | Conic coefficient |
|---|---|---|---|---|---|---|---|
| | | | | Refractive index | Abbe number | | |
| OBJ | Spherical | Infinite | Infinite | | | | |
| S1 | Aspheric | 3.3386 | 0.5495 | 1.633 | 20.4 | −15.28 | −2.7763 |
| S2 | Aspheric | 2.3251 | 0.2848 | | | | −11.5633 |
| STO | Spherical | Infinite | −0.0079 | | | | |
| S3 | Aspheric | 1.7089 | 0.6762 | 1.633 | 20.4 | 5.32 | −8.2953 |
| S4 | Aspheric | 2.9241 | 0.7756 | | | | −0.2578 |
| S5 | Aspheric | −21.2083 | 0.5351 | 1.633 | 20.4 | 7.75 | −31.9907 |
| S6 | Aspheric | −4.0342 | 0.6204 | | | | 0.0000 |
| S7 | Aspheric | −0.9956 | 0.7705 | 1.633 | 20.4 | −17.51 | −1.0000 |
| S8 | Aspheric | −1.4222 | 0.1419 | | | | −0.9098 |
| S9 | Aspheric | 3.5602 | 2.0000 | 1.633 | 20.4 | 5.53 | −1.0173 |
| S10 | Aspheric | −200.0000 | 0.6669 | | | | 99.0000 |
| S11 | Spherical | Infinite | 0.2520 | 1.517 | 64.2 | | |
| S12 | Spherical | Infinite | 0.7148 | | | | |
| S13 | Spherical | Infinite | | | | | |

TABLE 18

| Surface number | A4 | A6 | A8 | A10 | A12 |
|---|---|---|---|---|---|
| S1 | −1.8854E−02 | 1.7907E−02 | −8.1682E−03 | 2.2052E−03 | −3.2400E−04 |
| S2 | −1.8476E−02 | 3.5539E−03 | −8.7047E−05 | −3.0658E−04 | 3.5870E−05 |
| S3 | 1.0381E−01 | −1.5663E−01 | 1.5568E−01 | −1.1537E−01 | 5.6129E−02 |
| S4 | −7.1605E−03 | −2.7545E−02 | 2.2170E−02 | −2.4559E−02 | 1.6936E−02 |
| S5 | −1.0258E−02 | −2.8397E−02 | 1.7199E−02 | −5.3161E−03 | −4.6221E−03 |
| S6 | −2.1013E−03 | −2.1650E−02 | −2.2111E−03 | 1.9902E−02 | −2.0348E−02 |
| S7 | 1.1492E−01 | −1.0544E−01 | 6.7070E−02 | −2.8736E−02 | 8.6246E−03 |
| S8 | 7.8699E−02 | −3.3731E−02 | −8.8176E−03 | 1.7972E−02 | −9.3234E−03 |
| S9 | 3.7312E−02 | −3.4777E−02 | 1.5622E−02 | −4.2561E−03 | 7.3022E−04 |
| S10 | 1.6513E−02 | −8.3794E−03 | 3.3351E−03 | −9.6682E−04 | 1.8004E−04 |

| Surface number | A14 | A16 | A18 | A20 |
|---|---|---|---|---|
| S1 | 1.5419E−05 | 0.0000E+00 | 0.0000E+00 | 0.0000E+00 |
| S2 | 0.0000E+00 | 0.0000E+00 | 0.0000E+00 | 0.0000E+00 |
| S3 | −1.6763E−02 | 2.7696E−03 | −1.9317E−04 | 0.0000E+00 |
| S4 | −6.7604E−03 | 1.5145E−03 | −1.7184E−04 | 7.2871E−06 |
| S5 | 3.7041E−03 | −8.9554E−04 | 7.3086E−05 | 0.0000E+00 |
| S6 | 9.9354E−03 | −2.5321E−03 | 3.2435E−04 | −1.6531E−05 |
| S7 | −1.6901E−03 | 1.9266E−04 | −1.0730E−05 | 1.8682E−07 |
| S8 | 2.5770E−03 | −4.1129E−04 | 3.5938E−05 | −1.3367E−06 |
| S9 | −7.8751E−05 | 5.1293E−06 | −1.8325E−07 | 2.7485E−09 |
| S10 | −2.1082E−05 | 1.4862E−06 | −5.7201E−08 | 9.1809E−10 |

Figure 18C:
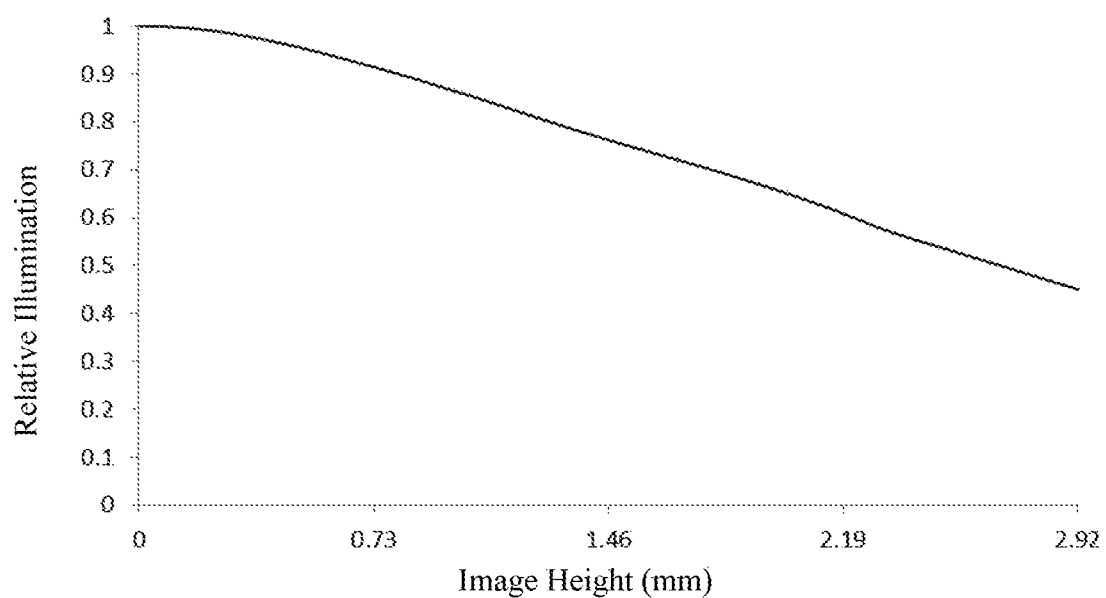

FIG. 18A illustrates an astigmatic curve of the optical imaging system according to example 9, representing a curvature of a tangential plane and a curvature of a sagittal plane. FIG. 18B illustrates a distortion curve of the optical imaging system according to example 9, representing amounts of distortion corresponding to different image heights. FIG. 18C illustrates a relative illumination curve of the optical imaging system according to example 9, representing the relative illumination changes corresponding to different image heights. It can be seen from FIG. 18A to FIG. 18C that the optical imaging system provided in example 9 may achieve good image quality.

In view of the above, examples 1 to 9 respectively satisfy the relationship shown in Table 19.

TABLE 19

| Conditional/Example | 1 | 2 | 3 | 4 | 5 | 6 | 7 | 8 | 9 |
|---|---|---|---|---|---|---|---|---|---|
| EPD/CT2 | 6.18 | 6.30 | 6.09 | 5.97 | 7.44 | 5.95 | 6.17 | 6.88 | 5.43 |
| (T34 + CT4)/CT5 | 0.90 | 1.15 | 1.33 | 0.79 | 1.21 | 0.83 | 1.22 | 0.97 | 0.70 |
| ImgH/EPD | 0.73 | 0.94 | 0.94 | 0.68 | 0.94 | 0.77 | 0.95 | 0.92 | 0.79 |
| f/TTL*EPD (mm) | 2.56 | 1.81 | 1.91 | 2.94 | 1.80 | 2.33 | 1.87 | 1.90 | 1.89 |
| f3/f | 1.87 | 1.56 | 1.63 | 0.92 | 1.45 | 2.15 | 1.67 | 1.33 | 1.89 |
| f/|f4| | 0.02 | 0.04 | 0.04 | 0.02 | 0.07 | 0.02 | 0.03 | 0.02 | 0.23 |
| f/R7 + f/R8 | −7.02 | −5.50 | −6.30 | −6.62 | −5.08 | −6.11 | −5.46 | −5.93 | −7.01 |
| R2/R1 | 1.21 | 0.89 | 1.06 | 1.23 | 2.10 | 0.98 | 1.31 | 1.40 | 0.70 |
| f/R3 + f/R4 | 3.59 | 3.26 | 3.03 | 3.52 | 2.85 | 3.31 | 2.90 | 2.94 | 3.81 |
| f/(T12 + T23) | 3.34 | 4.40 | 3.92 | 4.01 | 3.70 | 3.70 | 3.80 | 3.56 | 3.90 |
| CT2/CT1 | 0.78 | 0.92 | 0.91 | 0.64 | 0.64 | 0.79 | 0.87 | 0.73 | 1.23 |
| DT11/DT42 | 0.99 | 0.88 | 0.95 | 1.18 | 0.87 | 1.00 | 0.90 | 0.90 | 0.85 |
| (|SAG32| + T34)/|SAG41| | 1.22 | 2.03 | 1.58 | 1.44 | 1.47 | 1.23 | 2.23 | 1.41 | 1.04 |
| SAG42/ET45 | −0.66 | −0.72 | −0.82 | −0.70 | −0.76 | −0.73 | −0.85 | −0.99 | −0.57 |
| R7/R8 | 0.88 | 0.83 | 0.85 | 0.91 | 0.82 | 0.87 | 0.89 | 0.84 | 0.70 |
| f/EPD | 1.11 | 1.11 | 1.11 | 1.10 | 1.12 | 1.11 | 1.11 | 1.11 | 1.12 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging system described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging system, sequentially from an object side to an image side of the optical imaging system along an optical axis, comprising:
   a first lens having refractive power;
   a second lens having refractive power;
   a third lens having positive refractive power;

a fourth lens having refractive power; and
a fifth lens having refractive power,
wherein $0.5<\text{ImgH}/\text{EPD}<1.0$,
where ImgH is half of a diagonal length of an effective pixel area on an imaging plane of the optical imaging system, and EPD is an entrance pupil diameter of the optical imaging system; and
wherein $3.0<f/(T12+T23)<5.0$,
where f is a total effective focal length of the optical imaging system, T12 is a spaced interval between the first lens and the second lens along the optical axis, and T23 is a spaced interval between the second lens and the third lens along the optical axis.

2. The optical imaging system according to claim 1, wherein $5.0<\text{EPD}/\text{CT2}<8.0$,
where EPD is the entrance pupil diameter of the optical imaging system, and CT2 is a center thickness of the second lens.

3. The optical imaging system according to claim 1, wherein $0.5<(T34+CT4)/CT5<1.5$,
where CT4 is a center thickness of the fourth lens, CT5 is a center thickness of the fifth lens, and T34 is a spaced interval between the third lens and the fourth lens along the optical axis.

4. The optical imaging system according to claim 1, wherein $f3/f<2.5$,
where f is a total effective focal length of the optical imaging system, and f3 is an effective focal length of the third lens.

5. The optical imaging system according to claim 1, wherein $f/|f4|\leq 0.3$,
where f is a total effective focal length of the optical imaging system, and f4 is an effective focal length of the fourth lens.

6. The optical imaging system according to claim 1, wherein $f/R7+f/R8<-4.5$,
where f is a total effective focal length of the optical imaging system, R7 is a radius of curvature of an object-side surface of the fourth lens, and R8 is a radius of curvature of an image-side surface of the fourth lens.

7. The optical imaging system according to claim 1, wherein $0.5<R2/R1<2.5$,
where R1 is a radius of curvature of an object-side surface of the first lens, and R2 is a radius of curvature of an image-side surface of the first lens.

8. The optical imaging system according to claim 1, wherein $f/R3+f/R4>2.5$,
where f is a total effective focal length of the optical imaging system, R3 is a radius of curvature of an object-side surface of the second lens, and R4 is a radius of curvature of an image-side surface of the second lens.

9. The optical imaging system according to claim 1, wherein $0.5<CT2/CT1<1.5$,
where CT1 is a center thickness of the first lens, and CT2 is a center thickness of the second lens.

10. The optical imaging system according to claim 1, wherein $0.8<DT11/DT42\leq 1.2$,
where DT11 is a maximum effective radius of an object-side surface of the first lens, and DT42 is a maximum effective radius of an image-side surface of the fourth lens.

11. The optical imaging system according to claim 1, wherein $1.0\leq(|SAG32|+T34)/|SAG41|<2.5$,
where SAG32 is a distance along the optical axis from an intersection of an image-side surface of the third lens and the optical axis to a vertex of a maximum effective radius of the image-side surface of the third lens, SAG41 is a distance along the optical axis from an intersection of an object-side surface of the fourth lens and the optical axis to a vertex of a maximum effective radius of the object-side surface of the fourth lens, and T34 is a spaced interval between the third lens and the fourth lens along the optical axis.

12. The optical imaging system according to claim 1, wherein $-1.0\leq SAG42/ET45\leq -0.5$,
where SAG42 is a distance along the optical axis from an intersection of an image-side surface of the fourth lens and the optical axis to a vertex of a maximum effective radius of the image-side surface of the fourth lens, and ET45 is a spaced interval between the fourth lens and the fifth lens at the vertex of the maximum effective radius in a direction parallel to the optical axis.

13. The optical imaging system according to claim 1, wherein $0.5<R7/R8<1.0$,
where R7 is a radius of curvature of an object-side surface of the fourth lens, and R8 is a radius of curvature of an image-side surface of the fourth lens.

14. The optical imaging system according to claim 1, wherein $f/\text{EPD}<1.3$,
where f is a total effective focal length of the optical imaging system, and EPD is the entrance pupil diameter of the optical imaging system.

15. The optical imaging system according to claim 1, wherein $1.5\text{ mm}<f/TTL*EPD\leq 3.0\text{ mm}$,
where f is a total effective focal length of the optical imaging system, EPD is the entrance pupil diameter of the optical imaging system, and TTL is a distance along the optical axis from an object-side surface of the first lens to the imaging plane of the optical imaging system.

16. An optical imaging system, sequentially from an object side to an image side of the optical imaging system along an optical axis, comprising:
a first lens having refractive power;
a second lens having refractive power;
a third lens having positive refractive power;
a fourth lens having refractive power; and
a fifth lens having refractive power,
wherein $3.0<f/(T12+T23)<5.0$,
where f is a total effective focal length of the optical imaging system, T12 is a spaced interval between the first lens and the second lens along the optical axis, and T23 is a spaced interval between the second lens and the third lens along the optical axis; and
wherein $2.5<f/R3+f/R4<5.0$,
where f is the total effective focal length of the optical imaging system, R3 is a radius of curvature of an object-side surface of the second lens, and R4 is a radius of curvature of an image-side surface of the second lens.

17. The optical imaging system according to claim 16, wherein $0.85<f3/f<2.5$,
where f is the total effective focal length of the optical imaging system, and f3 is an effective focal length of the third lens.

18. The optical imaging system according to claim 16, wherein $1.5\text{ mm}<f/TTL*EPD\leq 3.0\text{ mm}$,
where f is the total effective focal length of the optical imaging system, EPD is an entrance pupil diameter of the optical imaging system, and TTL is a distance along the optical axis from an object-side surface of the first lens to an imaging plane of the optical imaging system.

* * * * *